(12) United States Patent
Matsukawa et al.

(10) Patent No.: US 12,216,324 B2
(45) Date of Patent: Feb. 4, 2025

(54) LENS BARREL

(71) Applicant: Panasonic Intellectual Property Management Co., Ltd., Osaka (JP)

(72) Inventors: Takahiro Matsukawa, Osaka (JP); Taku Ichikawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 335 days.

(21) Appl. No.: 17/334,853

(22) Filed: May 31, 2021

(65) Prior Publication Data

US 2021/0405320 A1 Dec. 30, 2021

(30) Foreign Application Priority Data

Jun. 26, 2020 (JP) .................. 2020-110586

(51) Int. Cl.
*G02B 7/02* (2021.01)
*G02B 7/04* (2021.01)

(52) U.S. Cl.
CPC ............... *G02B 7/04* (2013.01); *G02B 7/021* (2013.01)

(58) Field of Classification Search
CPC .................................. G02B 7/04; G02B 7/021
USPC .......................... 359/699–706, 825, 826, 830
See application file for complete search history.

(56) References Cited

U.S. PATENT DOCUMENTS

| | | | |
|---|---|---|---|
| 7,746,584 B2 | 6/2010 | Honsho et al. | |
| 7,920,345 B2 | 4/2011 | Honsho et al. | |
| 8,134,784 B2 | 3/2012 | Kato | |
| 9,983,381 B2 | 5/2018 | Shimizu | |
| 10,578,826 B2 | 3/2020 | Hasegawa et al. | |
| 11,150,436 B2 | 10/2021 | Matsushita et al. | |
| 2002/0141078 A1* | 10/2002 | Koiwai | G02B 7/04 359/822 |

(Continued)

FOREIGN PATENT DOCUMENTS

| | | | |
|---|---|---|---|
| CN | 111694124 A | | 9/2020 |
| JP | 2006078827 A | * | 3/2006 |

(Continued)

OTHER PUBLICATIONS

Notice of Reasons for Refusal dated Jan. 9, 2024 in corresponding Japanese Patent Application No. 2020-110586, with English Translation.

*Primary Examiner* — Mahidere S Sahle
(74) *Attorney, Agent, or Firm* — Renner, Otto, Boisselle & Sklar, LLP

(57) ABSTRACT

A lens barrel 10 comprises a substantially cylindrical first lens group unit 11 that holds a lens L1, and a substantially cylindrical front frame unit 12 that is disposed in a state of being close to the outer peripheral surface side of the substantially cylindrical first lens group unit 11. The first lens group unit 11 has a rectilinear key 11c that protrudes outward in the radial direction on the outer peripheral surface of the lens L1 on the image plane side in the optical axis direction. The front frame unit 12 has an inside diameter that is smaller than the outside diameter of the first lens group unit 11 in the portion where the rectilinear key 11c is provided. The first lens group unit 11 and the front frame unit 12 are formed so that a gap is formed between the outside diameter of the first lens group unit 11 and the inside diameter of the front frame unit 12 at a position opposite the rectilinear key 11c in the radial direction.

14 Claims, 27 Drawing Sheets

(56) References Cited

U.S. PATENT DOCUMENTS

| | | | |
|---|---|---|---|
| 2004/0125225 A1* | 7/2004 | Noguchi | G02B 7/021 |
| | | | 348/335 |
| 2008/0180812 A1 | 7/2008 | Honsho et al. | |
| 2010/0142939 A1 | 6/2010 | Honsho et al. | |
| 2011/0026137 A1 | 2/2011 | Kato | |
| 2016/0313534 A1 | 10/2016 | Shimizu | |
| 2017/0343763 A1 | 11/2017 | Hasegawa et al. | |
| 2020/0257075 A1* | 8/2020 | Matsushita | G02B 7/04 |
| 2022/0187561 A1 | 6/2022 | Chen et al. | |

FOREIGN PATENT DOCUMENTS

| | | | |
|---|---|---|---|
| JP | 2006-301291 A | 11/2006 | |
| JP | 2008-185786 A | 8/2008 | |
| JP | 2009-282393 A | 12/2009 | |
| JP | 2011-17790 A | 1/2011 | |
| JP | 2011-028093 A | 2/2011 | |
| JP | 4996269 B2 * | 8/2012 | G02B 15/173 |
| JP | 2015-179239 A | 10/2015 | |
| JP | 2016-051076 A | 4/2016 | |
| JP | 2021-117261 A | 8/2021 | |
| WO | WO-2016143326 A1 * | 9/2016 | G02B 15/15 |
| WO | 2019/087943 A1 | 5/2019 | |

\* cited by examiner

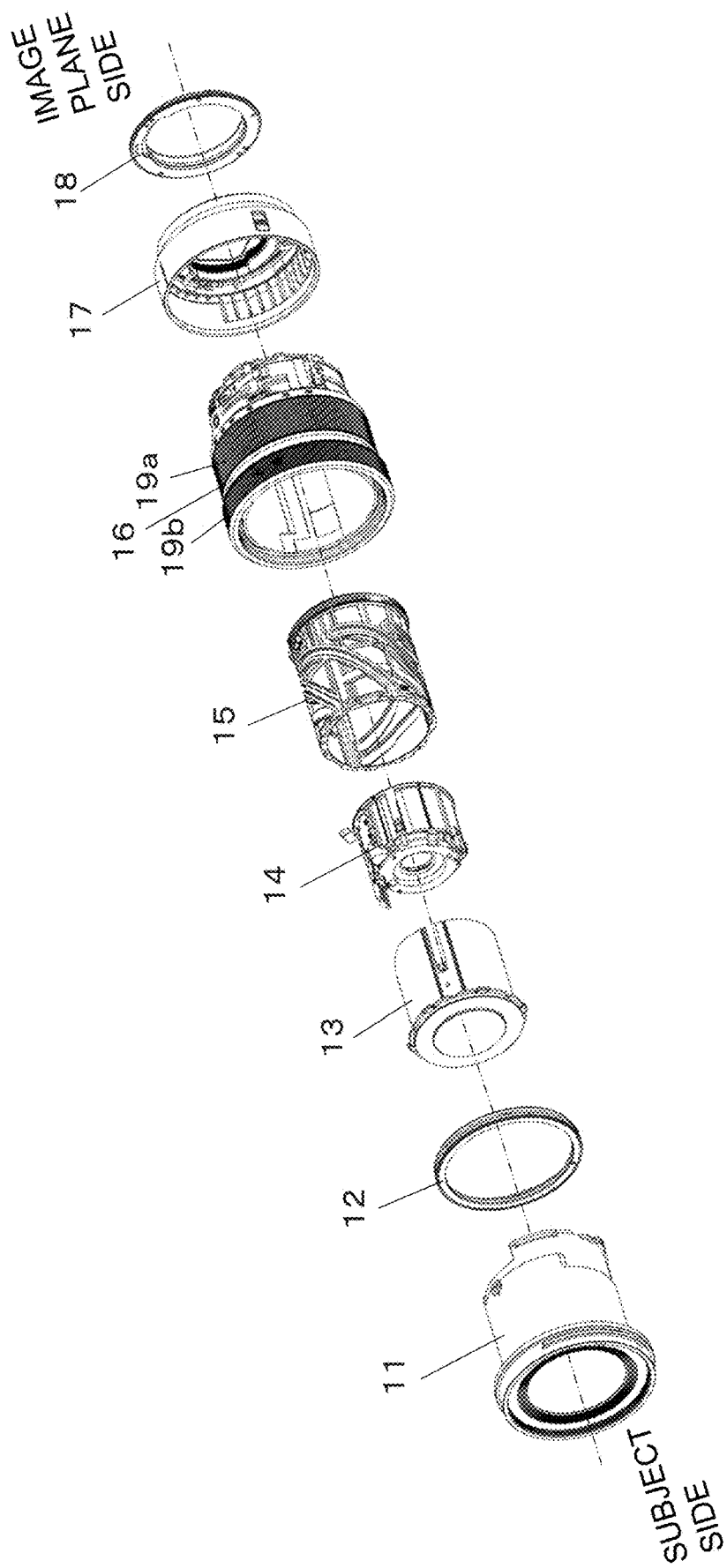

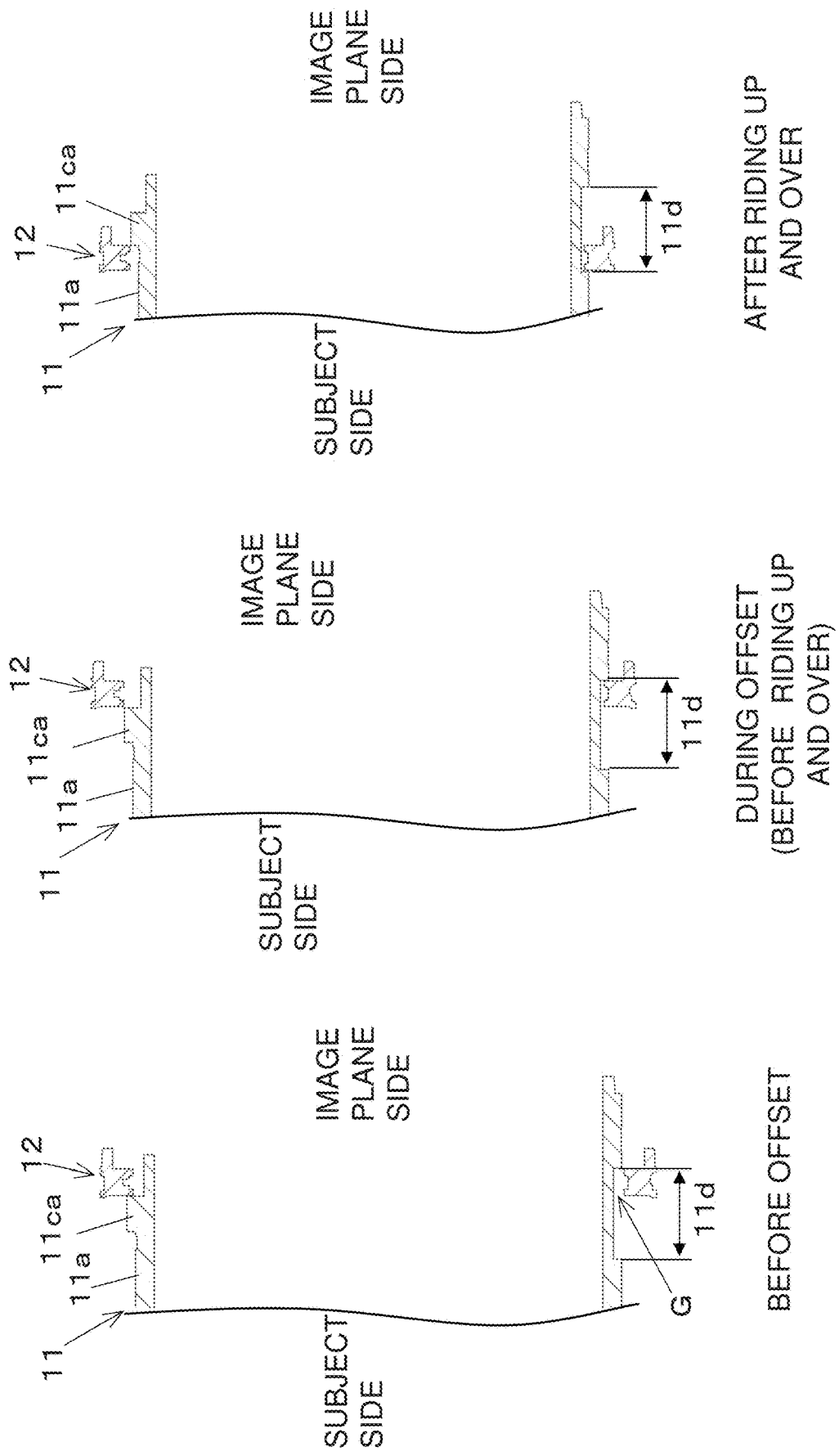

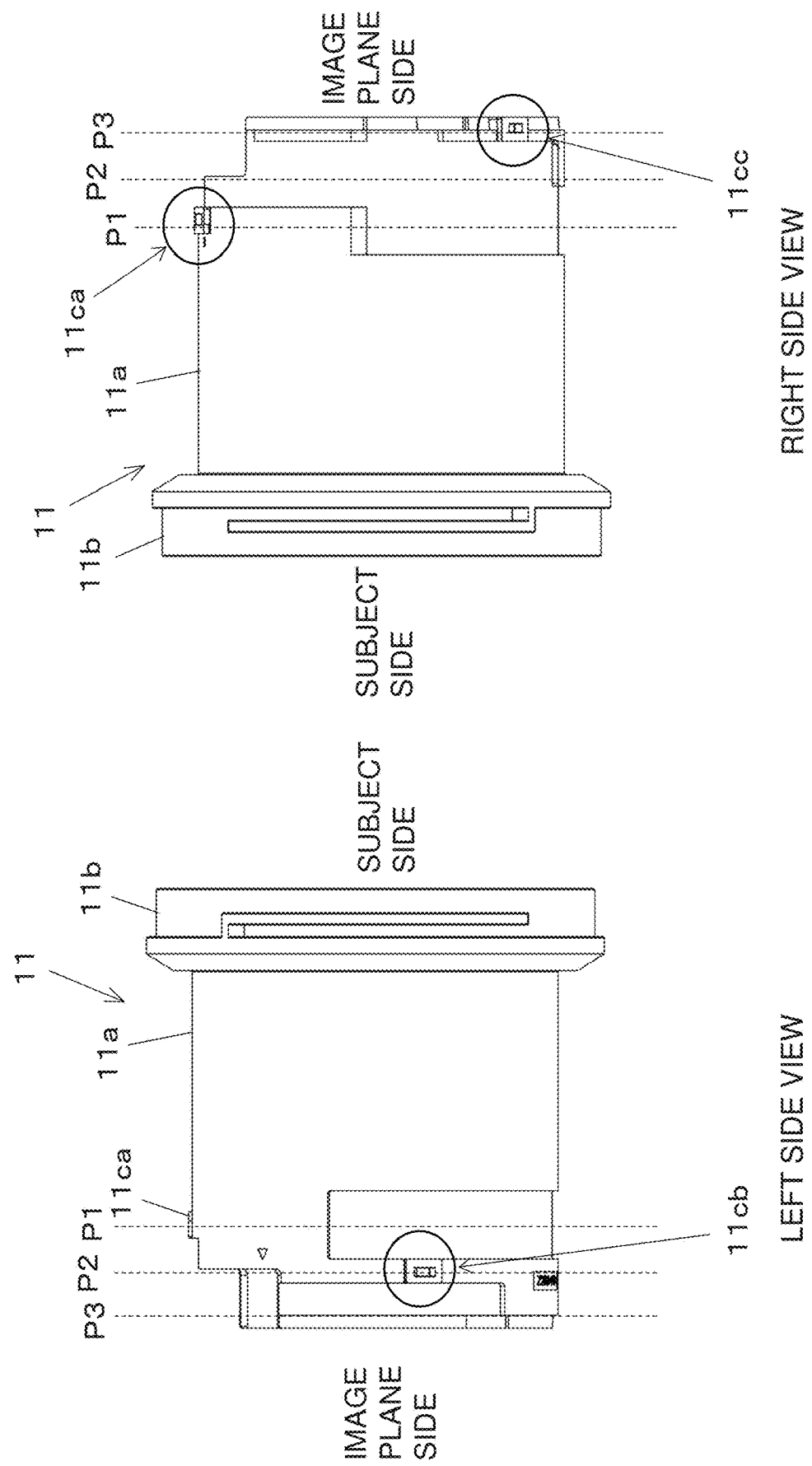

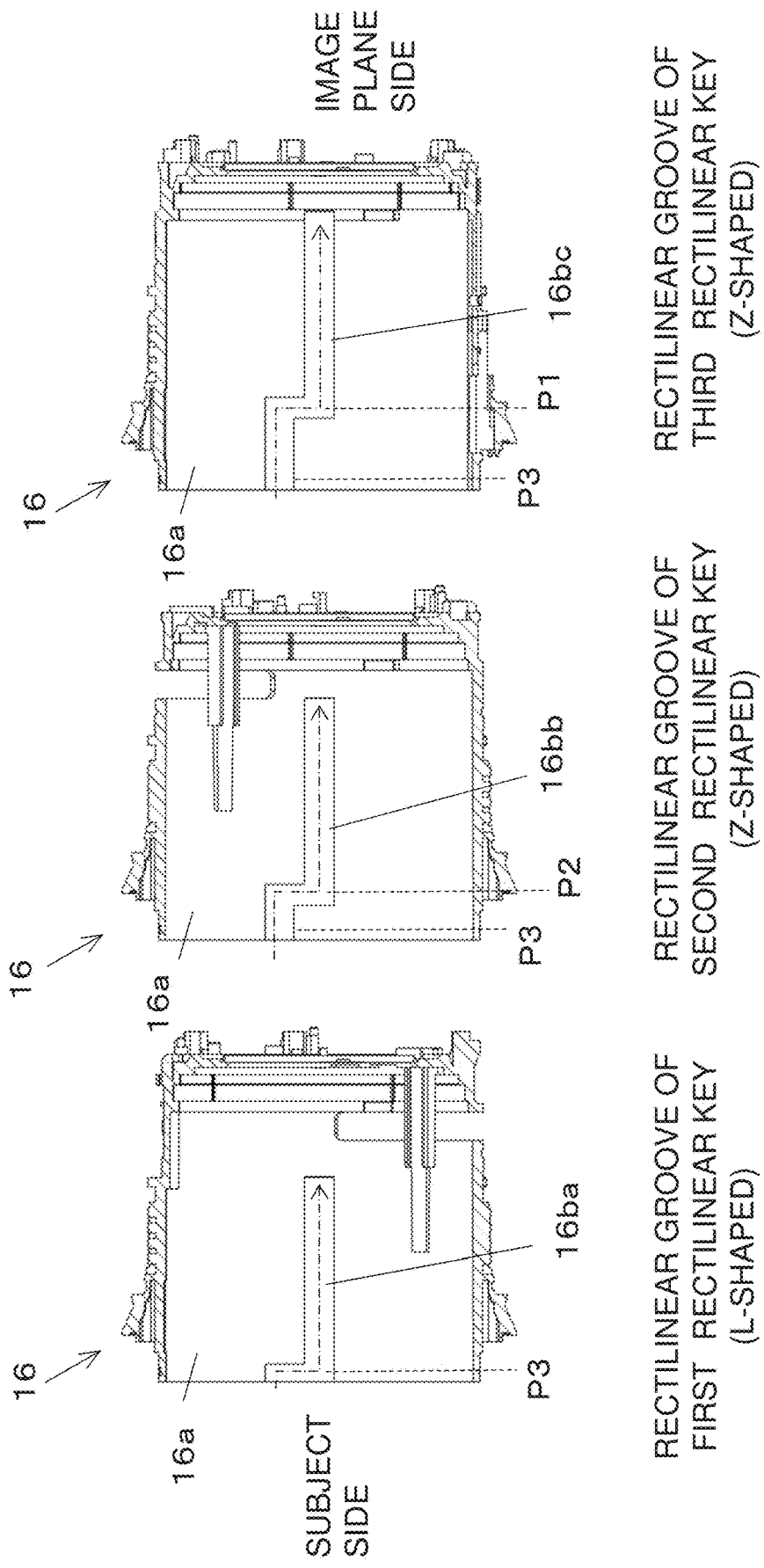

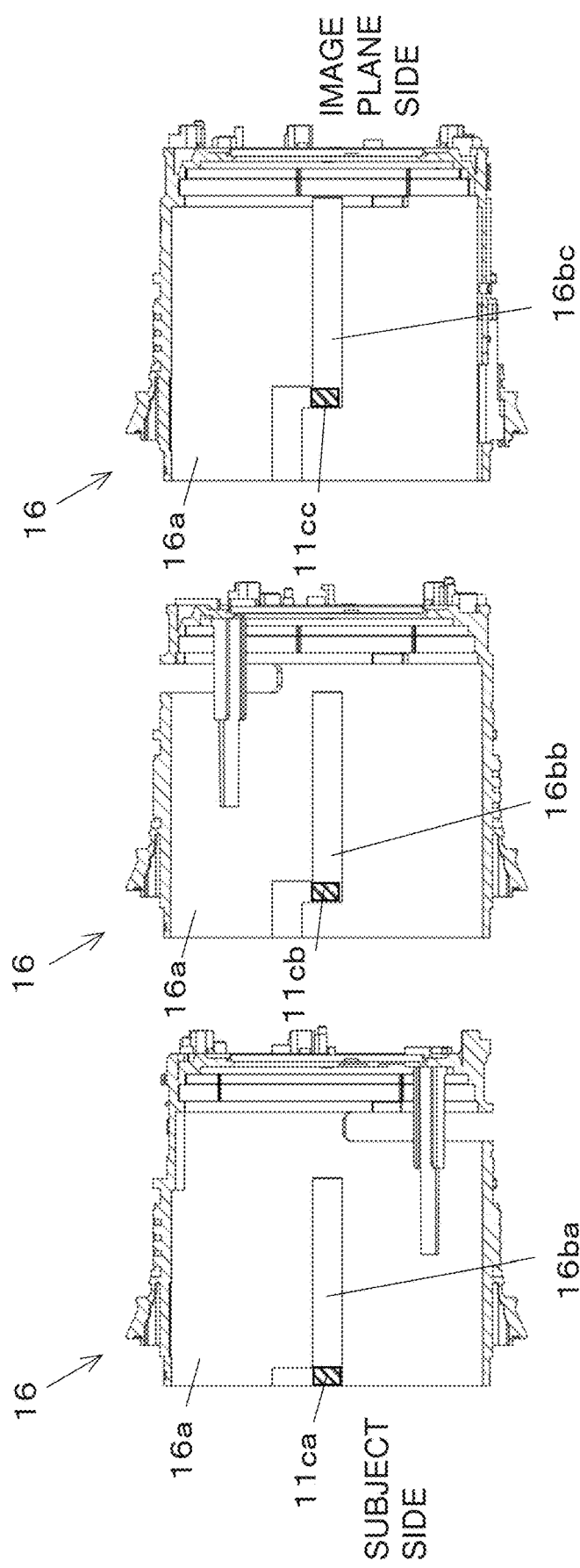

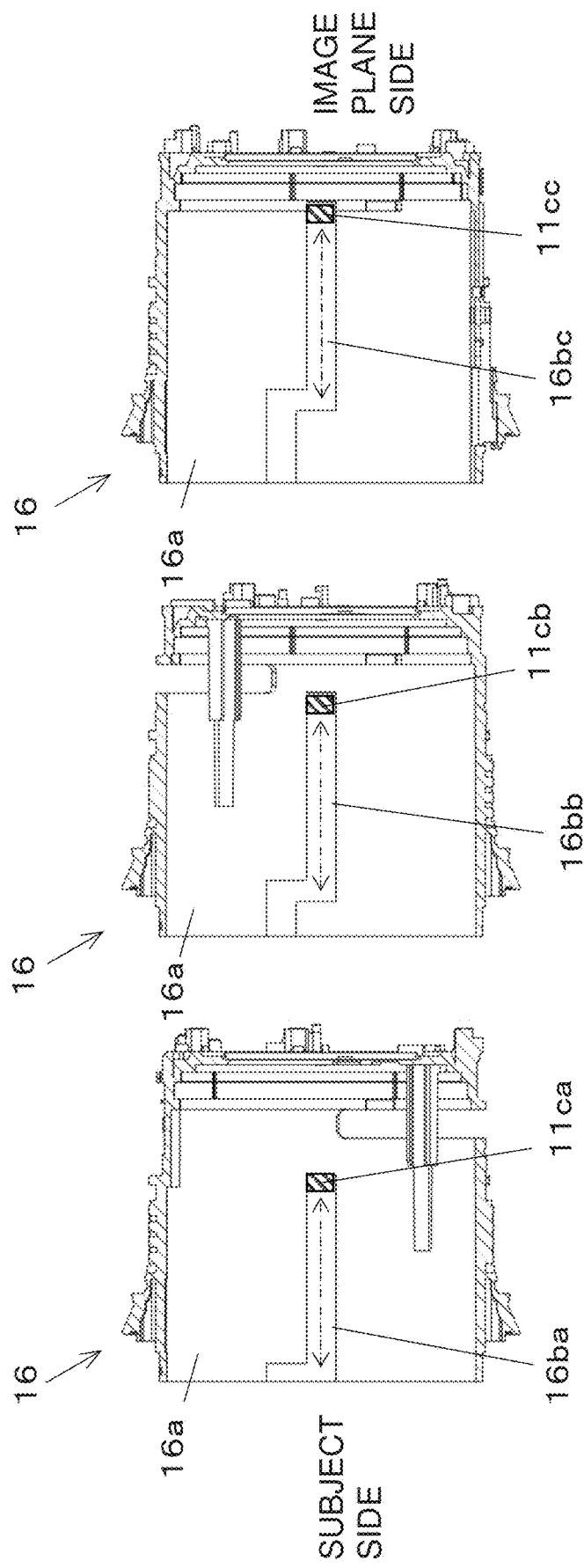

ATTACHED STATE

DEPLOYED STATE

LENS BARREL

CROSS-REFERENCE TO RELATED APPLICATIONS

This application claims priority to Japanese Patent Application No. 2020-110586 filed on Jun. 26, 2020. The entire disclosure of Japanese Patent Application No. 2020-110586 is hereby incorporated herein by reference.

BACKGROUND

Technical Field

The present disclosure relates to a lens barrel.

Description of the Related Art

A lens barrel constituted by a combination of substantially cylindrical members including a plurality of lenses is attached to a digital camera or another such imaging device.

For example, Patent Literature 1 discloses a lens barrel comprising a first frame and a second frame that is inserted into the first frame and provided so as to be capable of relative motion in the optical axis direction.

With this lens barrel, the first frame and the second frame are provided with n number of rectilinear guide recesses that extend in the optical axis direction and are disposed at angular positions that substantially divide the circumferential direction into n number of equal parts, and n number of rectilinear guide protrusions that movably engage with the rectilinear guide recesses. From one to (n−1) of these n number of rectilinear guide recesses are provided to the first frame, the rest being provided to the second frame. The n number of rectilinear guide protrusions are provided to a different frame from the frame provided with the engaging rectilinear guide recesses. (Here, n is an integer of 2 or more).

Also, Patent Literature 2 discloses a lens barrel comprising a cylindrical first lens holder that holds a first lens group; a cylindrical second lens holder that holds a second lens group; a cam cylinder on the inner peripheral surface of which is formed an inner cam groove for driving one of the first lens holder and the second lens holder, and on the outer peripheral surface of which is formed an outer cam groove for driving the other of the first lens holder and the second lens holder; a first rectilinear guide that restricts the rotation of the first lens holder around the optical axis or around an axis parallel to the optical axis; and a second rectilinear guide that restricts the rotation of the second lens holder around the optical axis or around an axis parallel to the optical axis, and in which relative movement is restricted with respect to the first rectilinear guide in the circumferential direction around the rotational axis of the cam cylinder.

CITATION LIST

Patent Literature

Patent Literature 1: JP-A 2015-179239
Patent Literature 2: JP-A 2011-17790

SUMMARY

However, the following problems are encountered with the conventional lens barrel discussed above.

That is, with a lens barrel constituted by a combination of a plurality of cylindrical parts, such as the lens barrel disclosed in the above-mentioned publications, the outside diameter imposes limitations, which makes it necessary to use a configuration combining a plurality of parts, or to make the inside diameter of the cylindrical parts on the incorporating side slightly larger than the outside diameter of the cylindrical parts on the incorporated side, or to use some other such means.

It is an object of the present disclosure to provide a lens barrel constituted by a combination of a plurality of cylindrical parts, wherein the number of parts can be reduced as compared to a conventional lens barrel.

The lens barrel disclosed herein comprises a substantially cylindrical first frame that holds a lens, and a substantially cylindrical second frame that is disposed in a state of being close to the outer peripheral surface side of the substantially cylindrical first frame. The first frame has a protrusion protruding outward in the radial direction on the outer peripheral surface of the lens on the image plane side in the optical axis direction. The second frame has an inside diameter that is smaller than the outside diameter of the first frame in the portion where the protrusion is provided. The first frame and the second frame are formed so that a gap is formed between the outside diameter of the first frame and the inside diameter of the second frame at a position opposite the protrusion in the radial direction.

TECHNICAL EFFECTS

With the lens barrel disclosed herein, the number of parts in a lens barrel constituted by combining a plurality of cylindrical parts can be reduced as compared with a conventional lens barrel.

BRIEF DESCRIPTION OF DRAWINGS

FIG. 3 is an oblique view of the configuration of the lens barrel in FIG. 1A;

FIG. 7A is a cross-sectional view of the state before the offset of the A portion in FIG. 6;

FIG. 7B is a cross-sectional view of the state after the offset of the A portion in FIG. 6;

FIG. 7C is a cross-sectional view of the state after assembly of the A portion in FIG. 6;

FIG. 9A is a left side view of a second rectilinear key formed on the outer peripheral surface of the first lens group unit shown in FIG. 4B;

FIG. 9B is a right side view of a first rectilinear key and a third rectilinear key formed on the outer peripheral surface of the first lens group unit shown in FIG. 4B;

FIG. 10A is a development view of the inner peripheral surface of an exterior unit, showing a first rectilinear groove that engages with the first rectilinear key shown in FIG. 9B;

FIG. 10B is a development view of the inner peripheral surface of an exterior unit, showing a second rectilinear groove that engages with the second rectilinear key shown in FIG. 9A;

FIG. 10C is a development view of the inner peripheral surface of an exterior unit, showing a third rectilinear groove that engages with the third rectilinear key shown in FIG. 9B;

FIG. 12A is a developed view showing the position during rotation of the first rectilinear key of the first lens group unit engaged with the first rectilinear groove of the exterior unit shown in FIG. 10A;

FIG. 12B is a development view showing the position during rotation of the second rectilinear key of the first lens group unit engaged with the second rectilinear groove of the exterior unit shown in FIG. 10B;

FIG. 12C is a development view showing the position during rotation of the third rectilinear key of the first lens group unit engaged with the third rectilinear groove of the exterior unit shown in FIG. 10C;

FIG. 13A is a development view showing the position after attachment of the first rectilinear key of the first lens group unit engaged with the first rectilinear groove of the exterior unit shown in FIG. 10A;

FIG. 13B is a development view showing the position after attachment of the second rectilinear key of the first lens group unit engaged with the second rectilinear groove of the exterior unit shown in FIG. 10B;

FIG. 13C is a development view showing the position after attachment of the third rectilinear key of the first lens group unit engaged with the third rectilinear groove of the exterior unit shown in FIG. 10C;

DETAILED DESCRIPTION OF THE INVENTION

Figure 1A:
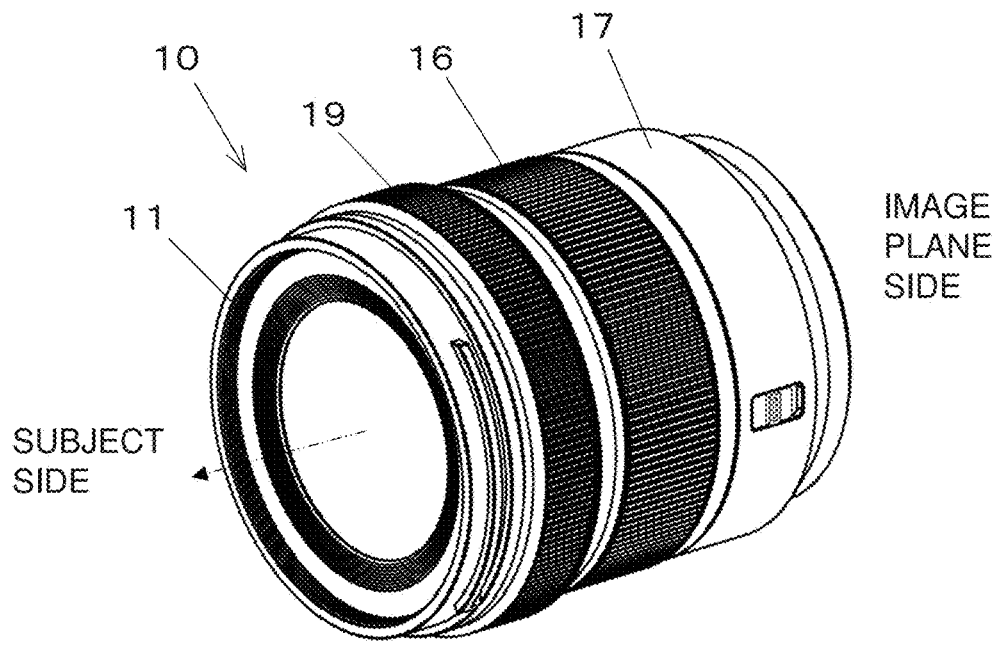
FIG. 1A is an oblique view of the configuration in a wide-angle state of the lens barrel according to an embodiment of this disclosure.

Embodiments of the present disclosure will now be described through reference to the drawings. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Embodiment 1

The lens barrel 10 according to an embodiment of the present disclosure will now be described with reference to FIGS. 1A to 26C.

(1) Configuration of Lens Barrel

As shown in FIGS. 1A and 1B, and FIGS. 2A and 2B, the lens barrel 10 according to this embodiment can be telescope between the wide-angle side and the telephoto side, and comprises an optical system including a plurality of lenses L1 to L11 disposed from the subject side to the image plane side in the optical axis direction; a first lens group unit (first frame) 11; a front frame unit (second frame) 12; a front frame unit (second frame) 12; a second lens group unit 13; a third/fourth lens group unit 14; a cam frame unit 15; an exterior unit (third frame) 16; a rear frame unit 17; and a lens mount 18. The lens barrel 10 is mounted on the lens mount 18 side in a replaceable state on a mount portion of a camera body (not shown).

As shown in FIGS. 1A and 1B, and FIGS. 2A and 2B, the lens barrel 10 captures images at variable magnification by having the built-in optical system move in the optical axis direction of the lenses L1 to L11 between the wide-angle side and the telephoto side.

With the lens barrel 10, when the optical system is located on the wide-angle side shown in FIGS. 1A and 2A, the first lens group unit 11 of the optical system (discussed below) is housed on the inner peripheral surface side of the exterior unit 16.

Figure 1B:
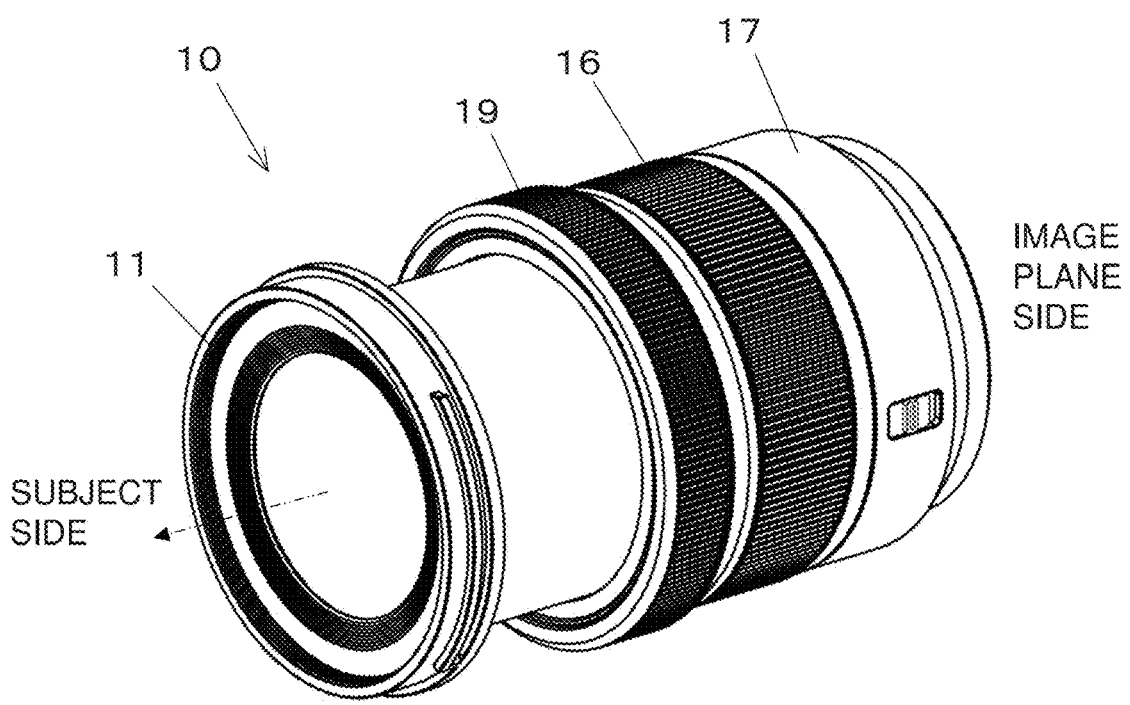
FIG. 1B is an oblique view of the configuration in a telephoto state of the lens barrel in FIG. 1A.
Figure 2A:
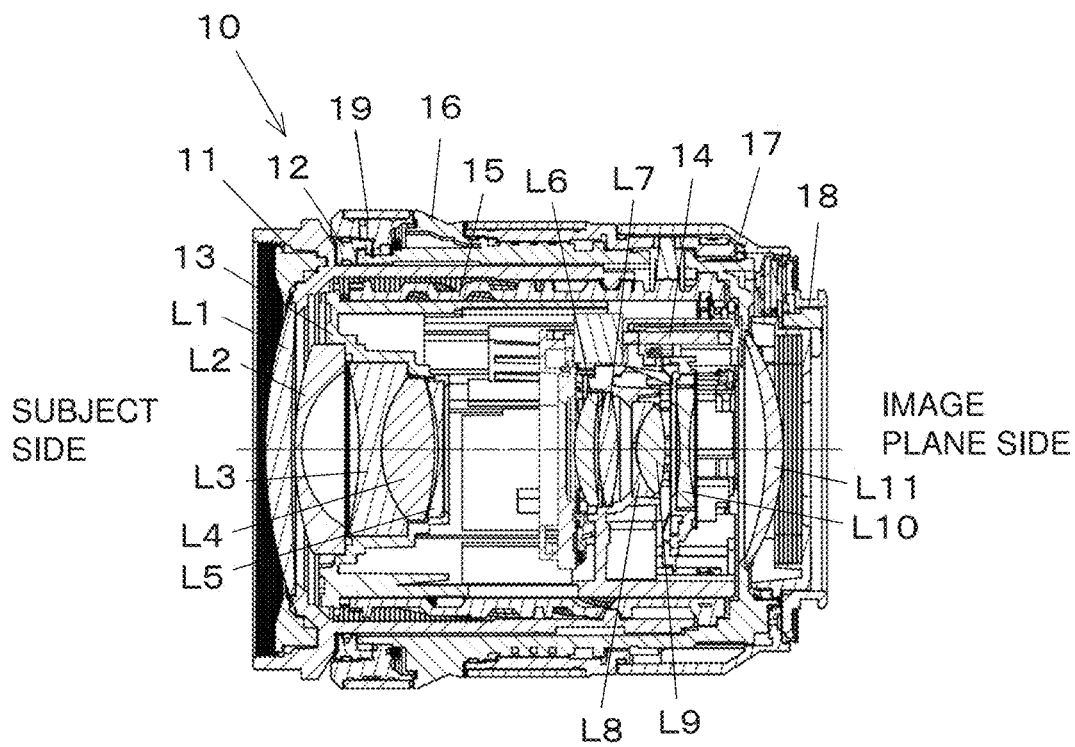
FIG. 2A is a cross-sectional view of the lens barrel in the wide-angle state in FIG. 1A.
Figure 2B:
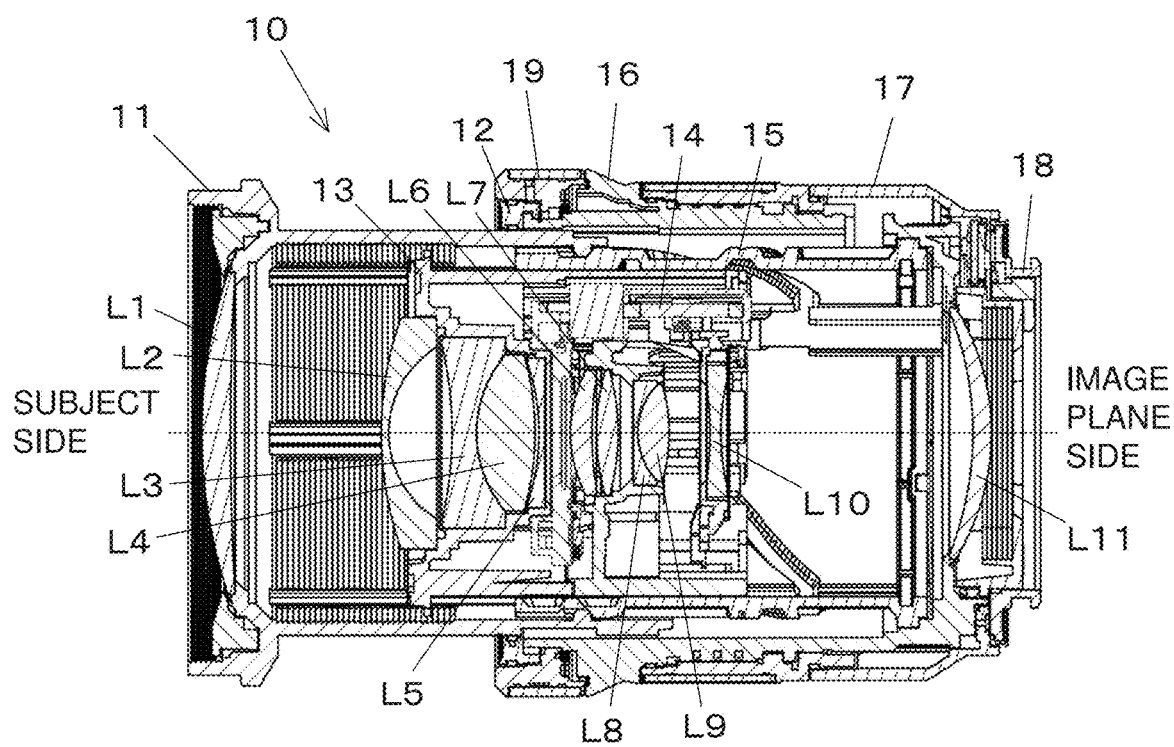
FIG. 2B is a cross-sectional view of the lens barrel in the telephoto state in FIG. 1B.

Meanwhile, with the lens barrel 10, when the optical system is located on the telephoto side shown in FIGS. 1B and 2B, the first lens group unit 11 moves toward the subject in the optical axis direction, and is deployed toward the subject from the exterior unit 16.

As shown in FIG. 3, the lens barrel 10 comprises, in the following order starting from the subject side in the optical axis direction, the first lens group unit (first frame) 11, the front frame unit (second frame) 12, the second lens group unit 13, the third/fourth lens group unit 14, the cam frame unit 15, the exterior unit (third frame) 16, the rear frame unit 17, and the lens mount 18.

The first lens group unit 11 is a substantially cylindrical member, and a lens L1 is disposed inside the first lens group unit 11 on the subject side as shown in FIGS. 2A and 2B. The first lens group unit 11 moves forward and backward in the optical axis direction in a state in which the lens L1 is held on the subject side.

Consequently, the distance between the lenses L1 and L11 changes, allowing wide-angle and telephoto imaging to be performed.

Figure 4A:
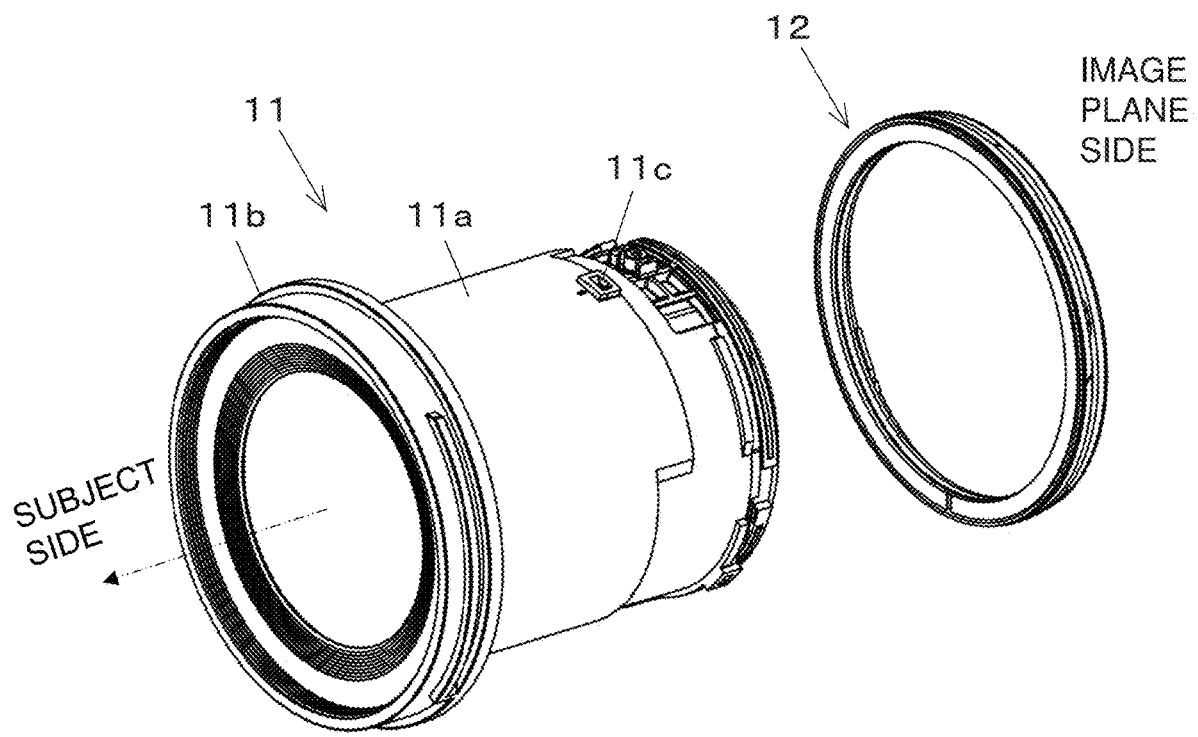
FIG. 4A is an oblique view of the state before the front frame unit is attached to the first lens group unit included in the lens barrel in FIG. 1A.
Figure 4B:
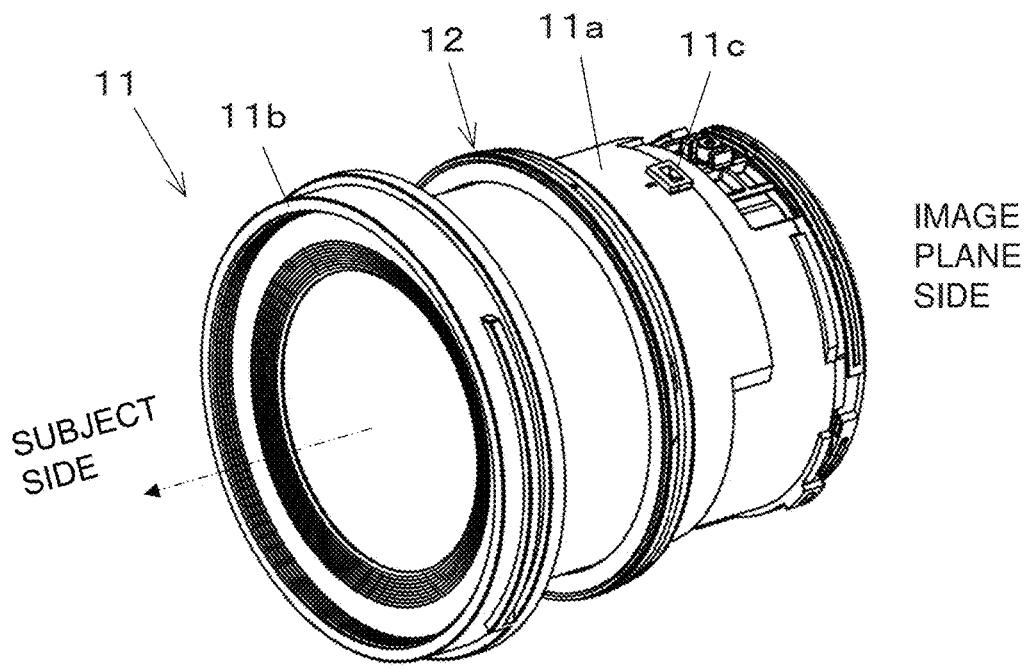
FIG. 4B is an oblique view of the state after the front frame unit has been attached to the first lens group unit included in the lens barrel in FIG. 1A.

The front frame unit (second frame) 12 is a substantially cylindrical (substantially annular) member that is disposed close to the outer peripheral surface of the substantially cylindrical first lens group unit 11, and as shown in FIGS. 4A and 4B, it is attached to the first lens group unit 11 by an offset attachment structure (discussed below). Also, the front frame unit 12 moves in the optical axis direction in a state of being fixed to the end portion on the subject side of the exterior unit 16 (discussed below), and a state of being integrated with the exterior unit 16 with respect to the first lens group unit 11. Also, the front frame unit 12 has an inner periphery having a substantially circular shape.

The offset attachment structure of the front frame unit 12 with respect to the first lens group unit 11 will be described in detail at a later point.

As shown in FIG. 3, the second lens group unit 13 is a member having a substantially cylindrical shape that is disposed on the inner peripheral surface side of the first lens group unit 11, and holds the lenses L2 to L5 as shown in FIGS. 2A and 2B. The lenses L2 to L5 are disposed further to the image plane side in the optical axis direction than the lens L1 held by the first lens group unit 11.

The third/fourth lens group unit 14 is a member having a substantially cylindrical shape that is disposed on the inner peripheral surface side of the second lens group unit 13, and holds the lenses L6 to L10 as shown in FIGS. 2A and 2B. The lenses L6 to L10 are disposed further to the image plane side in the optical axis direction than the lenses L2 to L5 held by the second lens group unit 13. The third/fourth lens group unit 14 is driven by an actuator to move back and forth in the optical axis direction while holding the lenses L6 to L10.

As shown in FIG. 3, the cam frame unit 15 is a member having a substantially cylindrical shape, and a cam groove is formed in the outer peripheral surface thereof. The cam frame unit 15 is disposed on the outer peripheral surface side of the second lens group unit 13 and the third/fourth lens group unit 14. Cam pins provided on the outer peripheral surfaces of the second lens group unit 13 and the third/fourth lens group unit 14 are fitted into a cam groove of the cam frame unit 15.

The cam pins of the second lens group unit 13 and the third/fourth lens group unit 14 move along the cam groove upon receiving a rotational drive force applied from a rotational drive source. Consequently, the first lens group unit 11, the second lens group unit 13, and the third/fourth lens group unit 14 can be moved back and forth in the optical axis direction.

As a result, the distance between the lenses L1 to L10 included in the first lens group unit 11, the second lens group unit 13, and the third/fourth lens group unit 14 can be adjusted, so wide-angle imaging, telephoto imaging, and the like can be performed.

Figure 5:
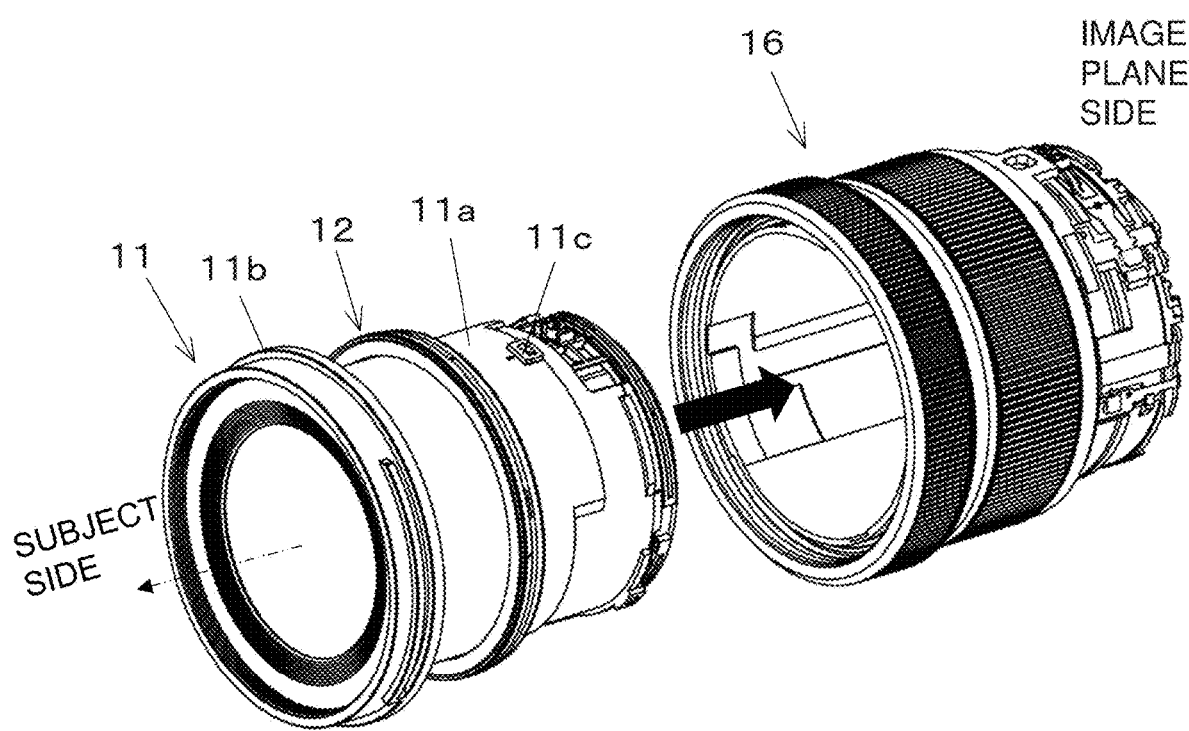
FIG. 5 is an oblique view of the state before the configuration shown in FIG. 4B is inserted on the inner peripheral surface side of the exterior unit.

As shown in FIGS. 3 and 5, the exterior unit (third frame) 16 is a member having a substantially cylindrical shape, which constitutes the exterior portion of the lens barrel 10. An annular zoom ring 19a, a focus ring 19b, and the like are attached to the outer peripheral surface of the exterior unit 16 so as to be rotatable around the circumferential direction. The exterior unit 16 is provided with a circuit board 21 (see FIG. 23) and an FPC 20 (see FIG. 24A, etc.) that is electrically connected to the circuit board 21, these being provided (discussed below) from the end face on the image plane side toward the subject side.

The attachment structure of the front frame unit 12 and the exterior unit 16 with respect to the first lens group unit 11 will be described in detail below.

The rear frame unit 17 is a member having a substantially cylindrical shape, which is attached to the end of the exterior unit 16 on the image plane side, and constitutes the exterior portion of the lens barrel 10 together with the exterior unit 16.

The lens mount 18 is a substantially annular member that is attached to the end of the rear frame unit 17 on the image plane side, and is mounted in a replaceable state to the mount unit of a camera body (not shown).

(2) Offset Attachment Structure of Front Frame Unit 12 with Respect to First Lens Group Unit 11

As described above, the lens barrel 10 in this embodiment comprises the substantially cylindrical first lens group unit 11 that holds the lens L1, and the substantially cylindrical front frame unit 12 that is disposed in a state of being close to the outer peripheral surface side of the substantially cylindrical first lens group unit 11.

Figure 6:
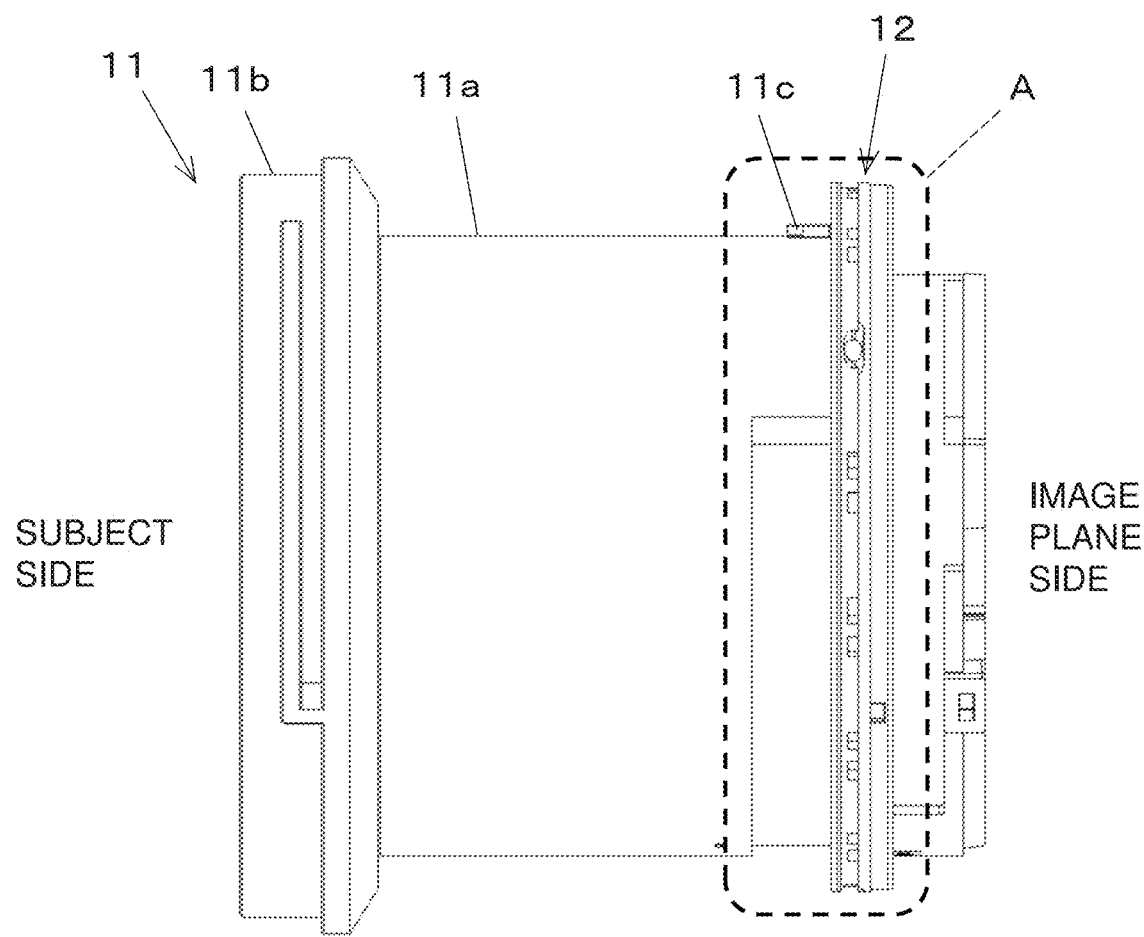
FIG. 6 is a side view of the state after the front frame unit has been attached to the first lens group unit shown in FIG. 4B.
Figure 8A:
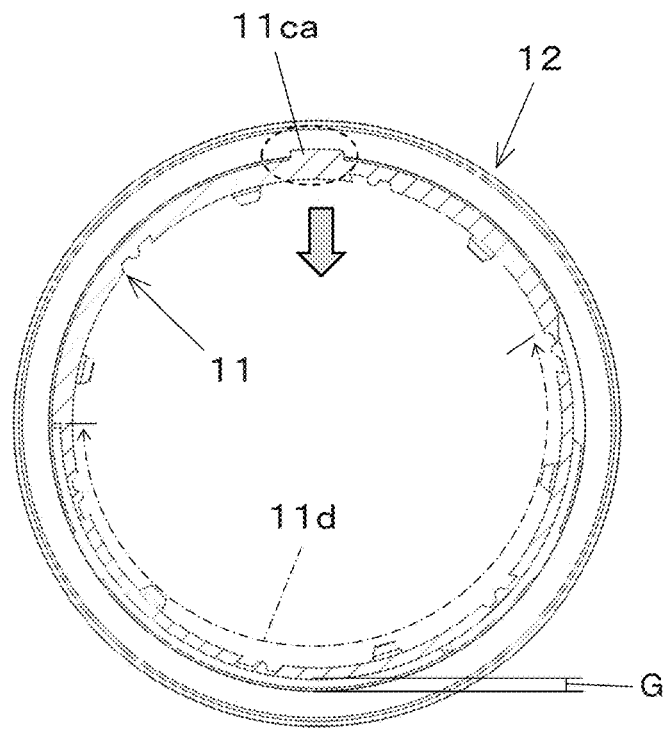
FIG. 8A is a front view of the state before offset in which the rectilinear key of the first lens group unit interferes with the inner peripheral surface of the front frame unit in the attachment of the front frame unit to the first lens group unit shown in FIG. 4B.

As shown in FIG. 6, the first lens group unit 11 has a substantially cylindrical outer peripheral surface 11a, a large diameter portion 11b having a larger outside diameter than the outer peripheral surface 11a, a plurality of rectilinear keys 11c, and a thin-walled portion (first thin-walled portion) 11d (see FIG. 8A, etc.).

The outer peripheral surface 11a is formed such that the large diameter portion 11b is integrated at the end on the subject side and the plurality of rectilinear keys 11c are integrated at the end on the image plane side.

The large diameter portion 11b is disposed on the subject side of the first lens group unit 11 in the optical axis direction, and its outside diameter is larger than the inside diameter of the front frame unit 12. Therefore, when the front frame unit 12 is mounted on the first lens group unit 11, mounting from the subject side is impossible, and mounting from the image plane side is essential.

The plurality of rectilinear keys 11c are formed so as to protrude outward in the radial direction from the outer peripheral surface 11a on the image plane side of the lens L1 in the optical axis direction.

More precisely, the plurality of rectilinear keys 11c include the first rectilinear key 11ca shown in FIGS. 7A to 7C and FIGS. 8A and 8B, and the second rectilinear key 11cb and the third rectilinear key 11cc shown in FIGS. 9A and 9B. The three rectilinear keys 11ca to 11cc are disposed on the outer peripheral surface 11a of the first lens group unit 11 at equal angular intervals of about 120 degrees in the circumferential direction when viewed from the optical axis direction. Furthermore, as shown in FIGS. 9A and 9B, the three rectilinear keys 11ca to 11cc are disposed at mutually different positions P1 to P3 in the optical axis direction on the outer peripheral surface 11a of the first lens group unit 11.

The first rectilinear key 11ca is disposed at the upper part of the outer peripheral surface 11a of the substantially cylindrical first lens group unit 11 in the state shown in FIGS. 8A and 9A, etc. The first rectilinear key 11ca is disposed at a position opposite the thin-walled portion 11d (discussed below) in the radial direction. In an attached state, the first rectilinear key 11ca moves in a state of being engaged with a substantially L-shaped first rectilinear groove 16ba (see FIG. 10A) formed in the inner peripheral surface of the main body portion 16a of the exterior unit 16 (discussed below).

In the state shown in FIGS. 8A and 9A, etc., the second rectilinear key 11cb is disposed at a position approximately 120 degrees from the first rectilinear key 11ca along the circumferential direction of the outer peripheral surface 11a of the substantially cylindrical first lens group unit 11.

In an attached state, the second rectilinear key 11cb moves in a state of being engaged with a substantially Z-shaped second rectilinear groove 16bb (see FIG. 10B) formed in the inner peripheral surface of the main body portion 16a of the exterior unit 16 (discussed below).

In the state shown in FIGS. 8A and 9A, etc., the third rectilinear key 11cc is disposed at a position approximately 120 degrees from the first rectilinear key 11ca along the circumferential direction of the outer peripheral surface 11a of the substantially cylindrical first lens group unit 11 in the opposite direction from that of the second rectilinear key 11cb. In an attached state, the third rectilinear key 11cc moves in a state of being engaged with a substantially Z-shaped third rectilinear groove 16bc (see FIG. 10C) formed in the inner peripheral surface of the main body portion 16a of the exterior unit 16 (discussed below).

As shown in FIG. 8A, the thin-walled portion 11d is a portion of reduced wall thickness of a substantially cylindrical member formed on a portion on the outer peripheral surface side that is opposite the first rectilinear key 11ca in the radial direction. The thin-walled portion 11d forms a specific gap G, which is required for offset attachment, between its own outer peripheral surface side and the inner peripheral surface of the front frame unit 12.

More specifically, the thin-walled portion 11d is provided on the outer peripheral surface 11a of the first lens group unit 11 over a range of more than about 180 degrees, opposite the first rectilinear key 11ca in the radial direction.

Figure 8B:
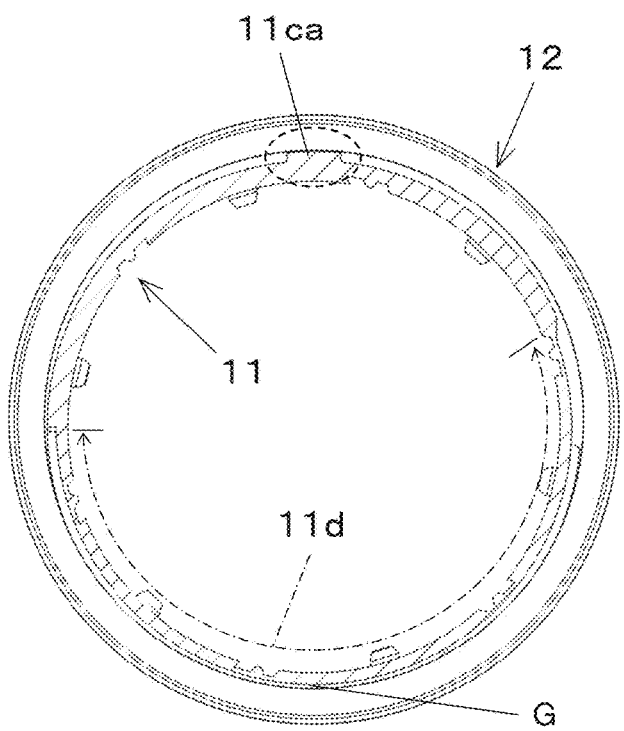
FIG. 8B is a front view of the state after offset so that the rectilinear key of the first lens group unit will not interfere with the inner peripheral surface of the front frame unit in the attachment of the front frame unit to the first lens group unit shown in FIG. 4B.

Consequently, the front frame unit 12 can move to the state of being offset shown in FIG. 8B, so that the front frame unit 12 rides up and over the first rectilinear key 11ca without interfering with the first rectilinear key 11ca in the optical axis direction.

Also, a recess is formed in which the thin-walled portion 11d its width in the optical axis direction is a width w represented by the following relational expression (1).

Width w=width of first rectilinear key 11ca+width of front frame unit 12×2    (1)

The front frame unit 12 has an inside diameter that is smaller than the outside diameter of the first lens group unit 11 in the portion where the rectilinear key 11c is provided. This means that some kind of measure must be taken in order to dispose the front frame unit 12 on the outer peripheral surface 11a of the first lens group unit 11, such as fitting the parts together while avoiding the plurality of rectilinear keys 11c provided on the outer peripheral surface 11a of the first lens group unit 11, or using a front frame unit 12 that is made up of a plurality of parts.

In view of this, with the lens barrel 10 in this embodiment, as shown in FIGS. 8A and 8B, the first lens group unit 11 and the front frame unit 12 are formed at positions opposite the rectilinear key 11c in the radial direction, so that a gap G is formed between the outside diameter and the inside diameter of the front frame unit 12.

That is, the gap G is formed between the thin-walled portion 11d formed by the recess on the outer peripheral surface side of the first lens group unit 11, and the inner peripheral surface of the front frame unit 12.

With the lens barrel 10 in this embodiment, offset attachment is performed by using the gap G to offset the first lens group unit 11 downward as shown in FIG. 8B, so that the front frame unit 12 rides up and over the first rectilinear key 11ca formed so as to protrude outward in the radial direction from the outer peripheral surface 11a of the first lens group unit 11.

More specifically, in attaching the front frame unit 12 to the outer peripheral surface 11a of the first lens group unit 11, if an attempt is made to attach the front frame unit 12 just as it is, the first rectilinear key 11ca will interfere with the front frame unit 12 because this key protrudes as shown in FIG. 7A.

In view of this, with the lens barrel 10 in this embodiment, the first lens group unit 11 is offset downward in FIG. 7B by using the gap G formed between the inner peripheral surface of the front frame unit 12 and the thin-walled portion 11d formed at a position that is opposite, in the radial direction, the first rectilinear key 11ca on the outer peripheral surface 11a of the first lens group unit 11.

Consequently, as shown in FIG. 7C, the front frame unit 12 rides up and over the first rectilinear key 11*ca* without any interference, moving from the state shown in FIG. 4A to the state shown in FIG. 4B (subject side), allowing the front frame unit 12 to be attached to the outer peripheral surface 11*a* of the first lens group unit 11.

At this point, the width of the thin-walled portion 11*d* in the optical axis direction forms a recess having a width w represented by the above-mentioned relational expression (1).

Consequently, the front frame unit 12 can move to a position where it has ridden up and over the first rectilinear key 11*ca* in the optical axis direction.

That is, the front frame unit 12 can ride up and over the first rectilinear key 11*ca* formed so as to protrude outward in the radial direction from the outer peripheral surface 11*a* of the first lens group unit 11. Therefore, even when the front frame unit 12 has an inside diameter that is smaller than the outside diameter of the first lens group unit 11 in the portion where the rectilinear key 11*c* is provided, the front frame unit 12 can be attached to the outer peripheral surface of the first lens group unit 11 as shown in FIG. 4B.

As a result, in the lens barrel 10 constituted by a combination of a plurality of cylindrical parts, fewer parts are needed than with a conventional configuration.

Figures 26A, 26B, 26C:
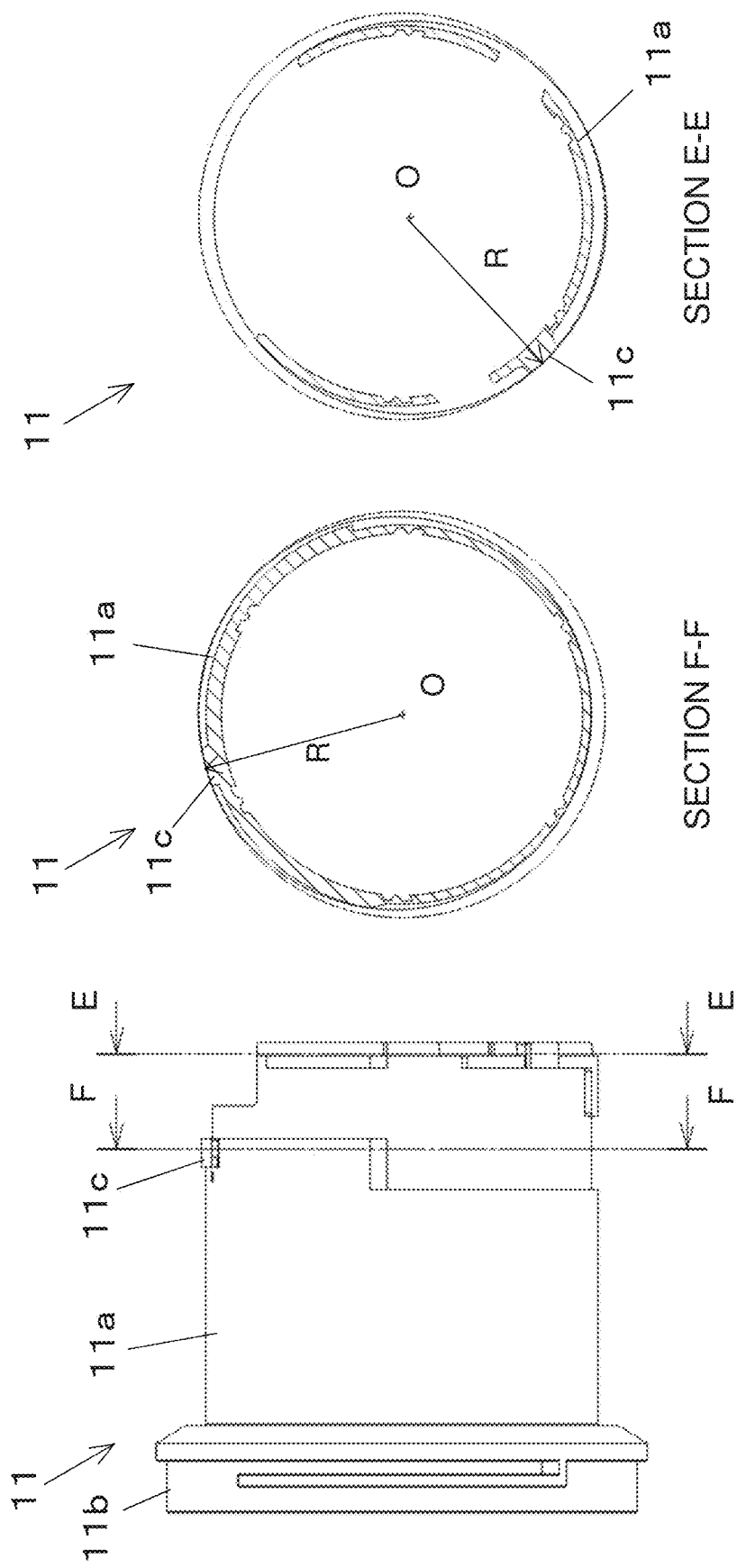
FIG. 26A is a side view of the configuration of the first lens group unit shown in FIG. 4B.
FIG. 26B is a cross-sectional view along F-F line in FIG. 26A.
FIG. 26C is a cross-sectional view along the E-E line in FIG. 26A.

Also, as shown in FIGS. 26A to 26C, the front frame unit 12 has an inside diameter that is larger than the circumscribed circle of the first lens group unit 11 in a plane perpendicular to the center axis O of the substantially cylindrical first lens group unit 11, including the rectilinear key 11*c* of the first lens group unit 11, and is less than twice the length from the center axis O of the substantially cylindrical first lens group unit 11 to the outer surface of the rectilinear key 11*c*.

More specifically, in order to attach the front frame unit 12 to the outer peripheral surface 11*a* of the first lens group unit 11 shown in FIG. 26A, the front frame unit 12 is configured such that its inside diameter satisfies the following conditions.

That is, as shown in FIG. 26B, the inside diameter of the front frame unit 12 is larger than the diameter of the circumscribed circle of the first lens group unit 11 in a plane perpendicular to the center axis O of the substantially cylindrical first lens group unit 11, including the rectilinear key 11*c* of the first lens group unit 11.

Furthermore, as shown in FIG. 26C, the inside diameter of the front frame unit 12 is less than twice the length R from the center axis O of the substantially cylindrical first lens group unit 11 to the outer surface of the rectilinear key 11*c*.

Thus, the inside diameter of the front frame unit 12 satisfies the following relation:

Diameter of circumscribed circle in FIG. 26*B*<inside diameter of front frame unit 12<*R*×2 in FIG. 26*C*

As a result, in the lens barrel 10 constituted by a combination of a plurality of cylindrical parts, the above-mentioned configuration in which the front frame unit 12 has an offset attachment structure with respect to the first lens group unit 11 means that fewer parts are needed than with a conventional configuration.

(3) Attachment Structure for Front Frame Unit 12 and Exterior Unit 16 to First Lens Group Unit 11

Next, the structure by which the front frame unit 12 is attached to the outer peripheral surface 11*a* of the first lens group unit 11 (see FIG. 4B), after which the exterior unit 16 is attached to the outer peripheral surface 11*a* of the first lens group unit 11 is as described below.

With the lens barrel 10 in this embodiment, as described above, three rectilinear keys 11*c* (first, second, and third rectilinear keys 11*ca*, 11*cb*, and 11*cc*) are provided at equal angle intervals of about 120 degrees are formed at different positions P1, P2, and P3 in the optical axis direction on the outer peripheral surface 11*a* of the first lens group unit 11 to which the exterior unit 16 is attached.

As shown in FIG. 5, these first to third rectilinear keys 11*ca*, 11*cb*, and 11*cc* move in a state of being engaged with grooves (first, second, and third rectilinear grooves 16*ba*, 16*bb*, 16*bc*) that have different shapes and are formed on the inner peripheral surface of the main body portion 16*a* of the exterior unit 16, when the exterior unit 16 is attached.

More specifically, the first, second, and third rectilinear grooves 16*ba*, 16*bb*, and 16*bc* have different shapes so as to correspond to the first, second, and third rectilinear keys 11*ca*, 11*cb*, and 11*cc* provided at different positions P1, P2, and P3 in the optical axis direction.

The first rectilinear groove 16*ba* is a groove with which the first rectilinear key 11*ca* is engaged, and as shown in FIG. 10A, is substantially L-shaped, including a rotation groove formed at the end on the subject side along the circumferential direction.

The second rectilinear groove 16*bb* is a groove in which the second rectilinear key 11*cb* is engaged, and as shown in FIG. 10B, is substantially Z-shaped and includes one rotation groove formed toward the image plane side by the distance between the positions P1 and P2, and two grooves that are formed in the optical axis direction and are connected respectively to the subject side and the image plane side of the rotation groove.

The third rectilinear groove 16*bc* is a groove in which the third rectilinear key 11*cc* is engaged, and as shown in FIG. 10C, is substantially Z-shaped shaped and includes one rotation groove formed toward the image plane side by the distance between the positions P1 and P3, and two grooves that are formed in the optical axis direction and are connected respectively to the subject side and the image plane side of the rotation groove.

Figures 11A, 11B, 11C:
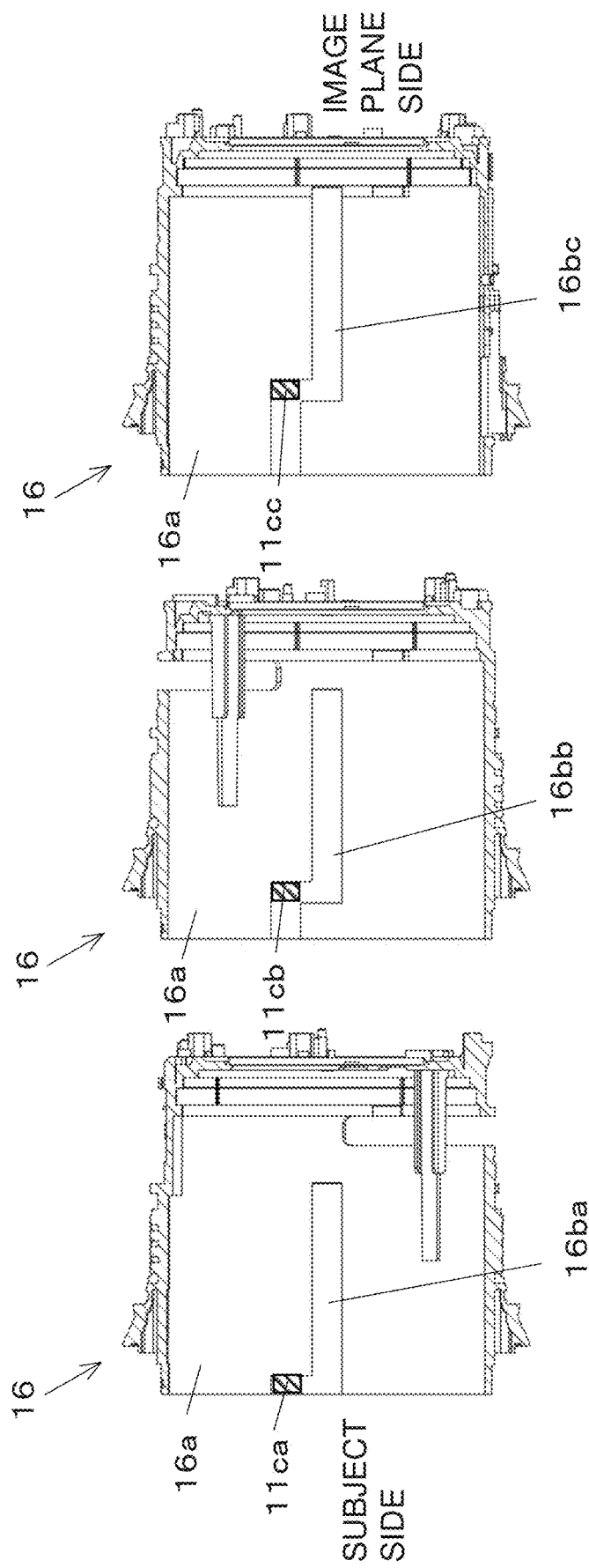
FIG. 11A is a development view showing the position at the start of attachment of the first rectilinear key of the first lens group unit engaged with the first rectilinear groove of the exterior unit shown in FIG. 10A.
FIG. 11B is a development view showing the position at the start of attachment of the second rectilinear key of the first lens group unit engaged with the second rectilinear groove of the exterior unit shown in FIG. 10B.
FIG. 11C is a development view showing the position at the start of attachment of the third rectilinear key of the first lens group unit engaged with the third rectilinear groove of the exterior unit shown in FIG. 10C.

In attaching the exterior unit 16 to the outer peripheral surface of the first lens group unit 11, as shown in FIGS. 11A to 11C, the first, second, and third rectilinear keys 11*ca*, 11*cb*, and 11*cc* are inserted up to the portion of the rotation groove in the first, second, and third rectilinear grooves 16*ba*, 16*bb*, and 16*bc*, respectively.

Next, when the first lens group unit 11 is rotated from this state in the circumferential direction with respect to the exterior unit 16, the first, second, and third rectilinear keys 11*ca*, 11*cb*, and 11*cc* move along the circumferential direction in a state of being engaged with the rotary grooves in the first, second, and third rectilinear grooves 16*ba*, 16*bb*, and 16*bc*, respectively, as shown in FIGS. 12A to 12C.

At this point, rotation of the first lens group unit 11 in the circumferential direction with respect to the exterior unit 16 (see FIG. 20) produces a state in which the end of the exterior unit 16 on the subject side and the image plane side of the front frame unit 12 are fixed to each other.

Consequently, the exterior unit 16 is integrated with the front frame unit 12, resulting in a state in which the exterior unit 16 is attached on the outer peripheral surface of the first lens group unit 11.

The structure by which the exterior unit 16 and the front frame unit 12 are fixed to each other will be described in detail below.

In the state shown in FIGS. 12A to 12C, the exterior unit 16 is attached to the outer peripheral surface 11a of the first lens group unit 11, and as shown in FIGS. 13A to 13C, the first, second, and third rectilinear keys 11ca, 11cb, and 11cc are able to move back and forth in the optical axis direction in a state of being engaged with the groove portions along the optical axis direction in the first, second, and third rectilinear grooves 16ba, 16bb, and 16bc, respectively.

Here, the structure by which and the front frame unit 12 and the end of the exterior unit 16 on the subject side are fixed to each other in a state in which the exterior unit 16 is attached to the outer peripheral surface 11a of the first lens group unit 11 will be described below.

Figure 14:
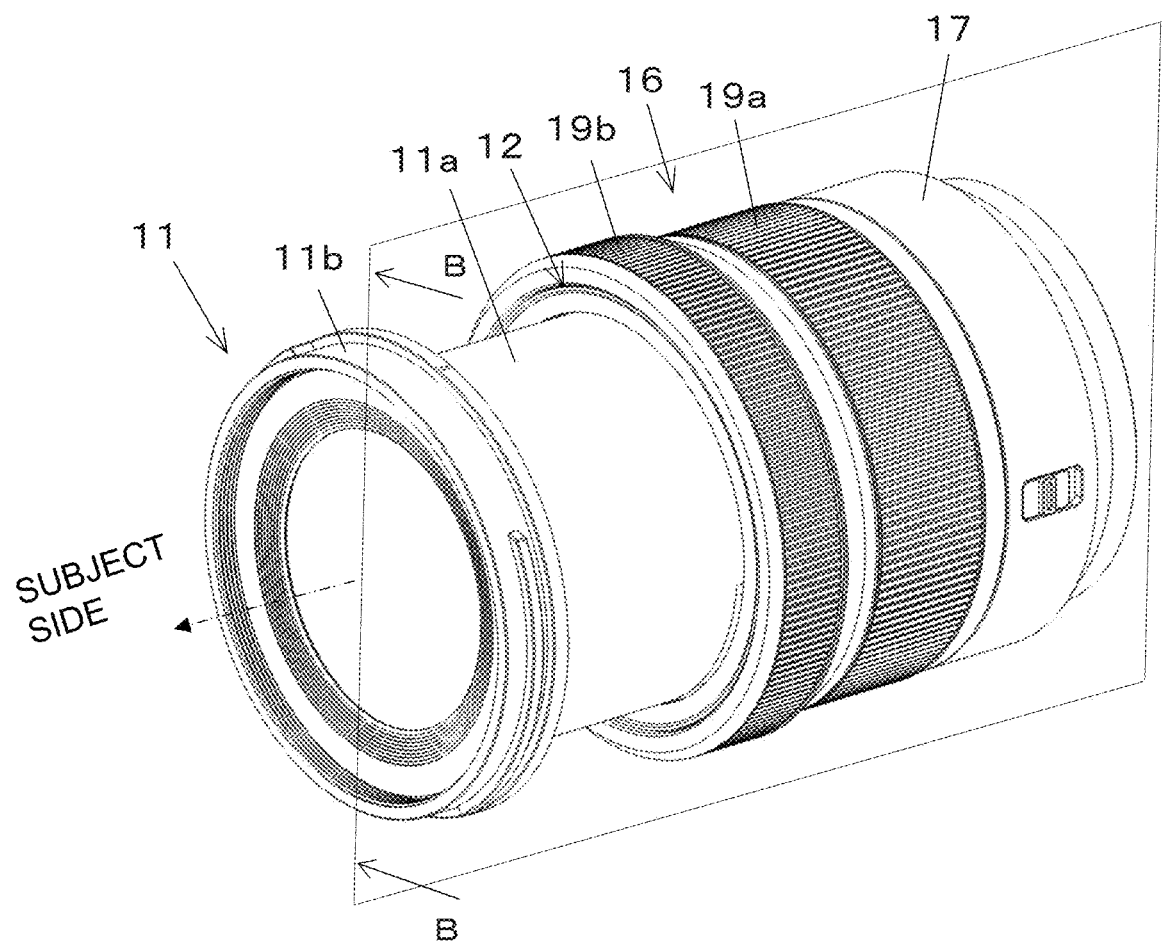
FIG. 14 is a oblique view of the lens barrel in the telephoto state in FIG. 1B.
Figure 15:
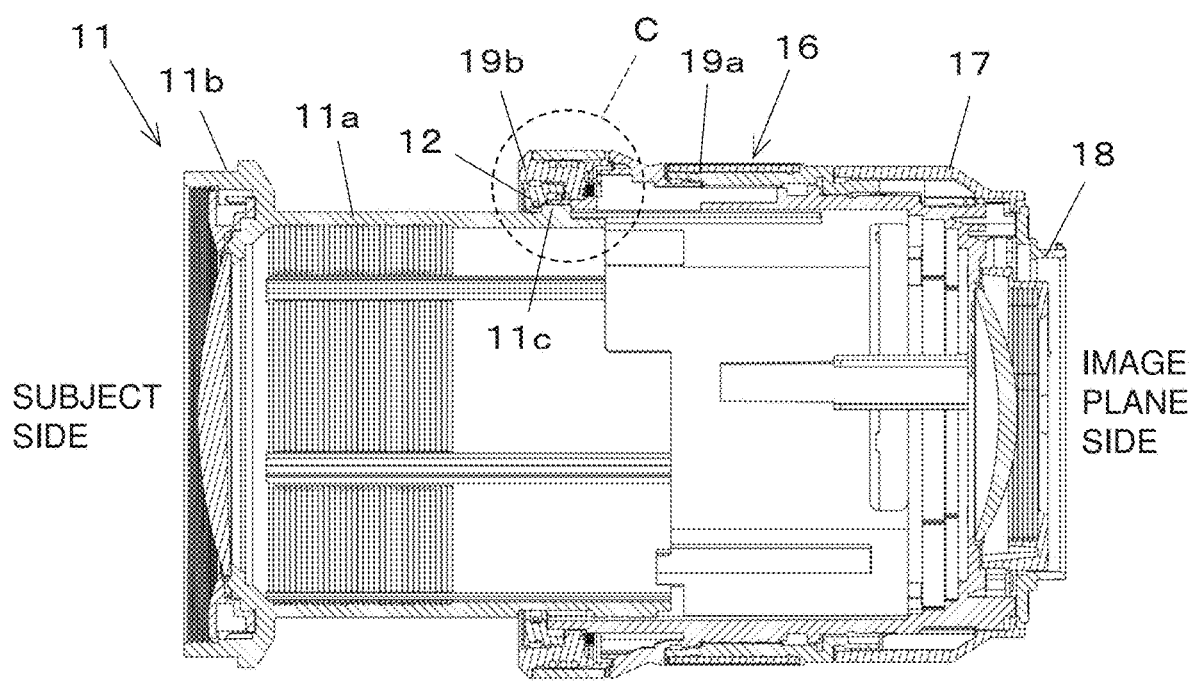
FIG. 15 is a cross-sectional view along the B-B plane in FIG. 14.
Figure 16:
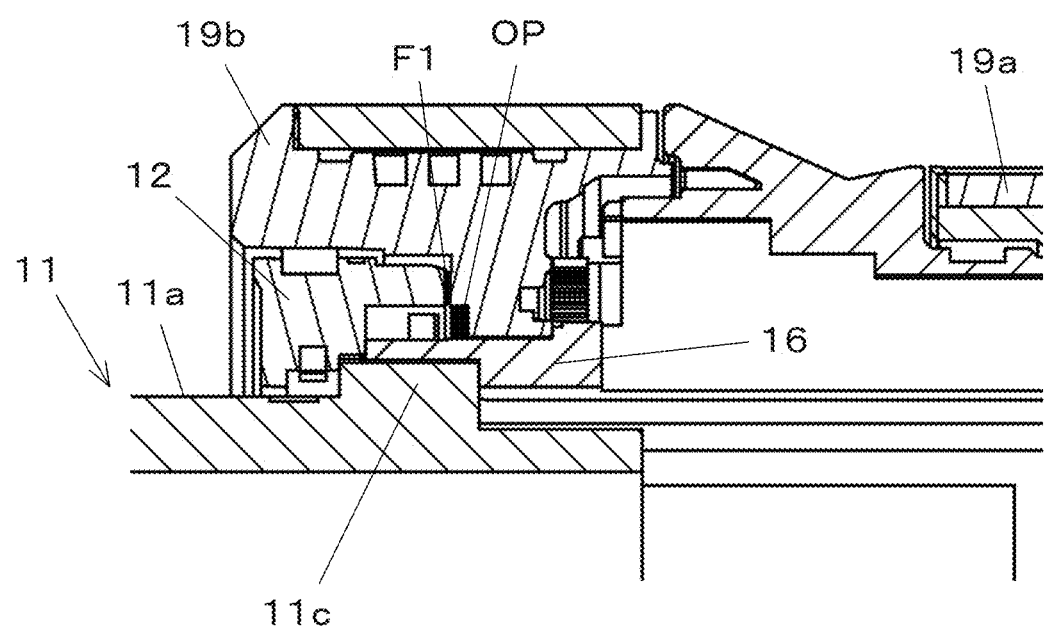
FIG. 16 is a detail view of the configuration of the C portion in FIG. 15.

As shown in FIG. 14, in a cross-sectional view along the B-B plane in a state in which the exterior unit 16 is attached to the outer peripheral surface 11a of the first lens group unit 11, the front frame unit 12 is fixed to and integrated with the end of the exterior unit 16 on the subject side as shown in FIG. 15 and in FIG. 16, which is a detail view of the C portion in FIG. 15.

Here, as shown in FIG. 16, a grease pocket GP is disposed near a sliding face F1 where the front frame unit 12 and a focus ring 19b of the exterior unit 16 slide against one another.

As shown in FIG. 16, the grease pocket GP is a space formed to the radial inside of the sliding face F1 and is filled with grease as a lubricant.

Consequently, in a product such as a lens barrel 10, in which a ring such as a focus ring 19b is manually operated, a space in which grease is accumulated is provided near a sliding surface F1 provided between two substantially cylindrical parts, making it possible to control the amount of grease applied, which is indispensable for obtaining good tactile operation.

Also, since the grease pocket GP is provided more to the inside in the radial direction than the sliding surface F1, it excess grease can be prevented from leaking out to the visible outside part of the lens barrel 10.

Figure 17C:
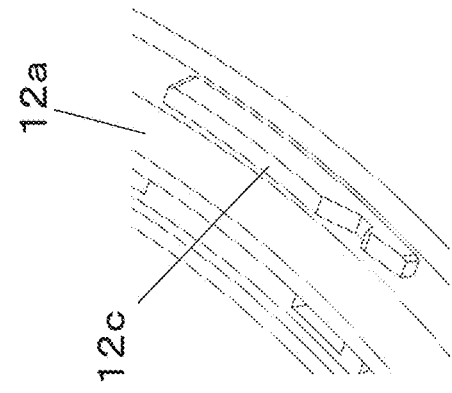
FIG. 17C is a detail view of the E portion in FIG. 17B.
Figure 17B:
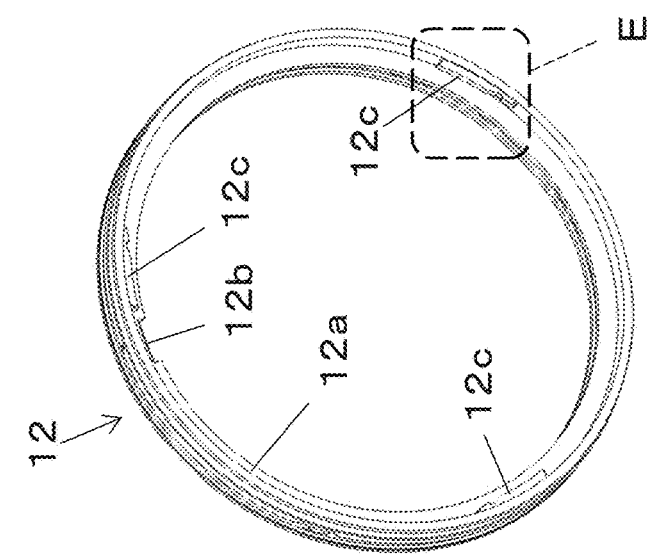
FIG. 17B is an oblique view of the configuration of the front frame unit.
Figure 17A:
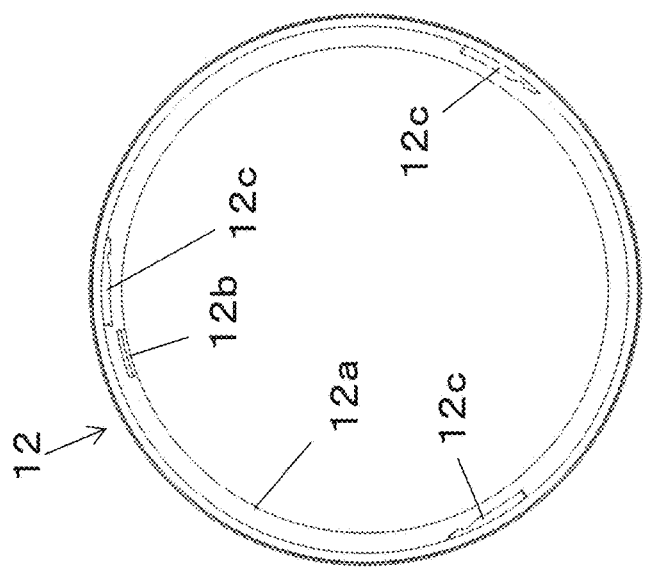
FIG. 17A is a rear view of the configuration of the front frame unit.

As shown in FIGS. 17A to 17C, the front frame unit 12 has a main body portion 12a, a recess 12b, and latching tabs (latching portions) 12c.

The main body portion 12a is a substantially annular member, having an inside diameter that is smaller than the outside diameter of the first rectilinear key 11ca portion of the first lens group unit 11, and is slightly larger than the outside diameter of the portion where the first rectilinear key 11ca is not provided.

As shown in FIGS. 17A and 17B, the recess 12b is formed on the end surface on the image plane side of the substantially annular main body portion 12a, and engages with the first rectilinear key 11ca of the first lens group unit 11 in the formation of the structure for fixing to the end on the subject side of the exterior unit 16 (discussed below). Consequently, movement of the front frame unit 12 to the image plane side is restricted because relative rotation with respect to the first lens group unit 11 is impossible.

As shown in FIGS. 17A and 17B, three latching tabs 12c are provided on the inner peripheral surface of the substantially annular main body portion 12a at equal angular intervals of about 120 degrees. As shown in FIG. 17C, the latching tabs 12c are formed so as to protrude radially inward from the inner peripheral surface, running in the circumferential direction on the inner peripheral surface of the substantially annular shape. The latching tabs 12c engage with tab portions 16d provided on the exterior unit 16 side to form a structure for fixing to the end on the subject side of the exterior unit 16.

Figure 18:
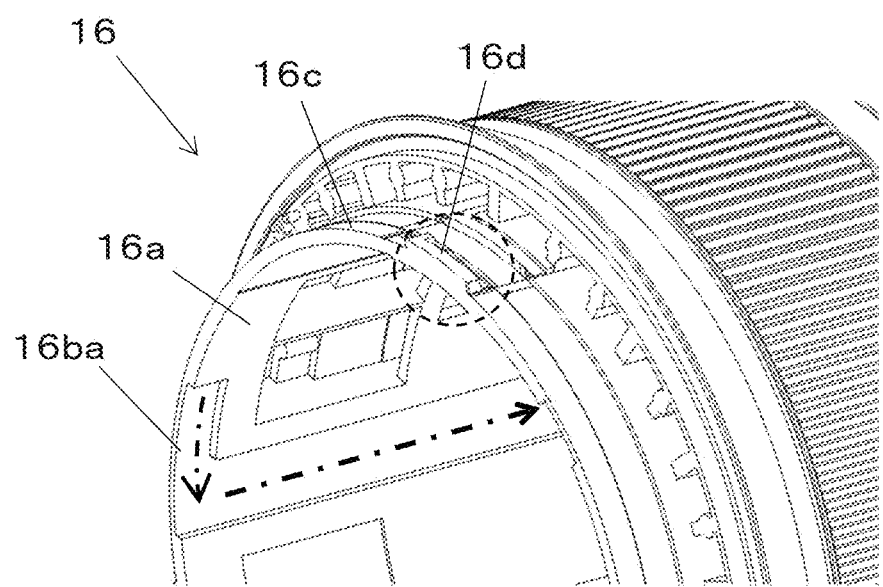
FIG. 18 is an oblique view of a tab provided at the end of the exterior unit that engages with a groove provided to the front frame unit in the attachment of the exterior unit and the front frame unit to the outer peripheral surface of the first lens group unit shown in FIG. 5, and a rotary groove and a rectilinear groove in which a rectilinear key engages and rotates and advances.

As shown in FIG. 18, the exterior unit 16 includes the substantially cylindrical main body portion 16a, the above-mentioned first to third rectilinear grooves 16ba to 16bc (see FIGS. 10A to 10C, etc.), an end portion 16c, and the tab portions 16d.

The end portion 16c and the tab portions 16d, which protrude outward in the radial direction from the outer peripheral surface at the end portion 16c of the main body portion 16a, are provided to the end on the subject side of the substantially cylindrical main body portion 16a.

As described above, the first to third rectilinear grooves 16ba to 16bc are formed on the inner peripheral surface of the substantially cylindrical main body portion 16a. The first, second, and third rectilinear grooves 16ba, 16bb, and 16bc then move back and forth in the optical axis direction in a state of being engaged with the groove portions along the optical axis direction in the first, second, and third rectilinear keys 11ca, 11cc, and 11cc, respectively.

The end portion 16c is a substantially cylindrical portion provided on the subject side of the substantially cylindrical main body portion 16a, and is fixed to the front frame unit 12 attached to the outer peripheral surface 11a of the first lens group unit 11.

Three of the tab portions 16d are provided at equal angle intervals of approximately 120 degrees on the outer peripheral surface of the end portion 16c of the main body portion 16a so as to engage with the three latching tabs 12c provided on the front frame unit 12 side (described above). The tab portions 16d are formed so as to protrude radially outward from the outer peripheral surface of the end portion 16c along the circumferential direction.

Figure 19:
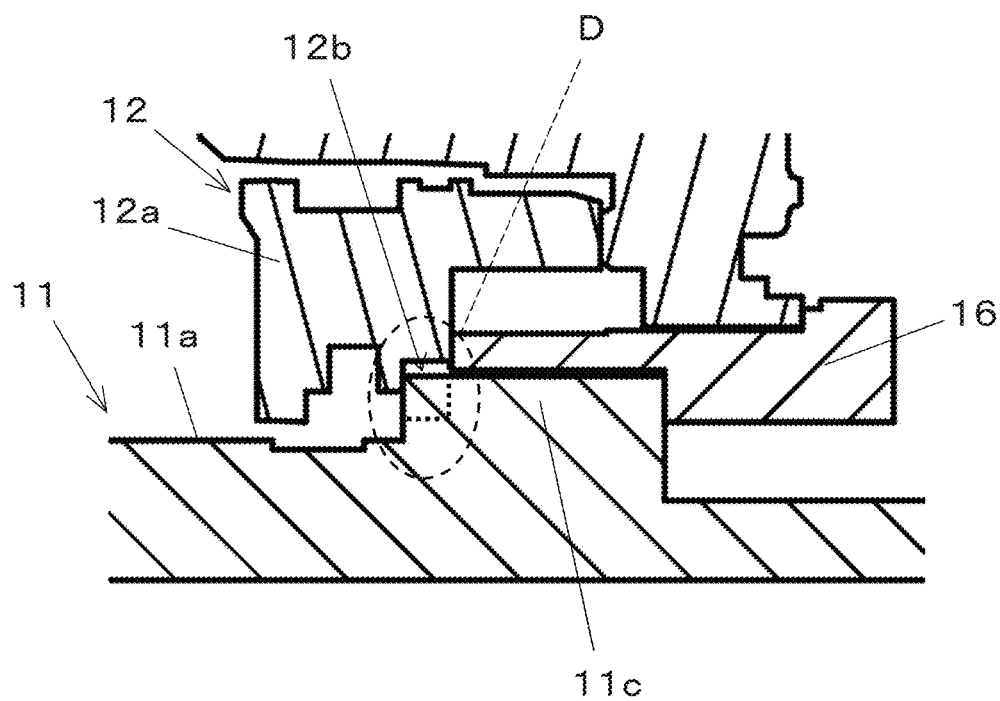
FIG. 19 is a cross-sectional view of the configuration near the rectilinear key in the attachment of the front frame unit and the exterior unit to the outer peripheral surface of the first lens group unit shown in FIG. 5.

This mutual fixing structure between the exterior unit 16 and the front frame unit 12 first forms a state in which, as shown in FIG. 19, the front frame unit 12 is attached to the outer peripheral surface of the first lens group unit 11 by the above-mentioned offset attachment, and in this state the first rectilinear key 11ca of the first lens group unit 11 is engaged with the recess 12b of the front frame unit 12.

While still in this state, as shown in FIG. 19, the exterior unit 16 is inserted so that the inner peripheral surface of the exterior unit 16 is disposed close to the outer peripheral surface 11a side of the first lens group unit 11.

At this point, since the first rectilinear key 11ca is engaged with the recess 12b in the D portion of FIG. 19, the front frame unit 12 is phase-aligned in the rotation direction.

Figure 20:
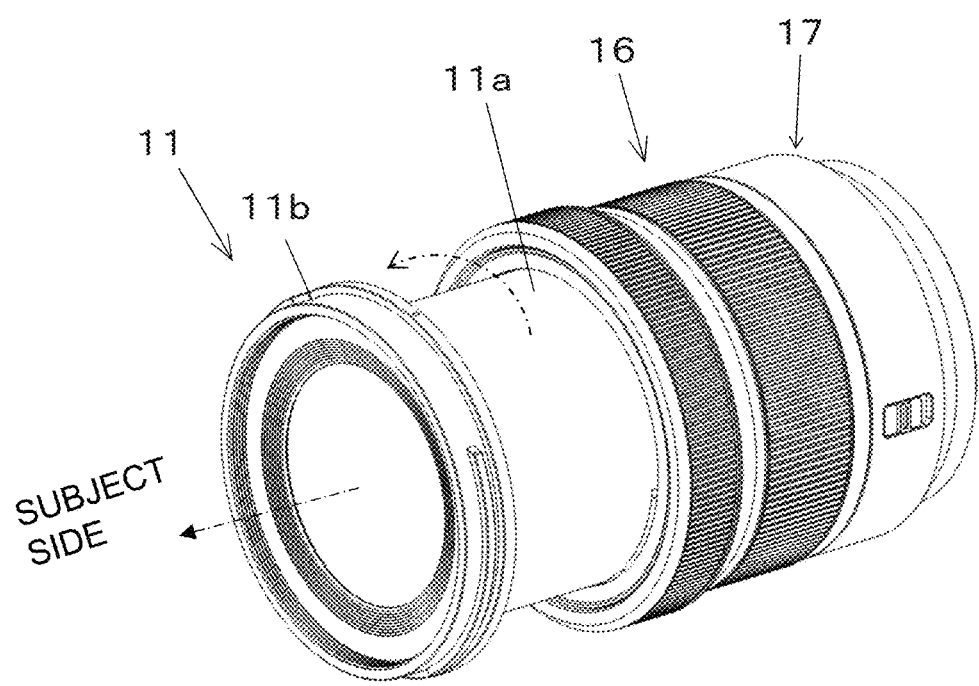
FIG. 20 is an oblique view of the state when the first lens group unit has been rotated with respect to the exterior unit in the attachment of the front frame unit and the exterior unit to the outer peripheral surface of the first lens group unit shown in FIG. 5.

Next, in this state, as shown in FIG. 20, when the first lens group unit 11 is rotated in the direction of the one-dot chain line arrow (counterclockwise) in the drawing, since the first rectilinear key 11ca is engaged with the recess 12b of the front frame unit 12, the front frame unit 12 rotates integrally along with the rotation of the first lens group unit 11.

Here, because of the relative rotation operation of the first lens group unit 11 with respect to the exterior unit 16 shown in FIG. 20, the integration of the front frame unit 12 and the exterior unit 16 is carried out simultaneously with the attachment of the front frame unit 12 and the exterior unit 16 to the first lens group unit 11.

That is, prior to the relative rotation operation of the first lens group unit 11 with respect to the exterior unit 16 shown in FIG. 20, the first to third rectilinear keys 11ca to 11cc of the first lens group unit 11 are disposed in the rotary groove portions of the first rectilinear grooves 16ba to 16bc formed on the inner peripheral surface of the exterior unit 16, as shown in FIGS. 11A to 11C.

The relative rotation operation of the first lens group unit 11 with respect to the exterior unit 16 shown in FIG. 20 then causes the first to third rectilinear keys 11ca to 11cc of the group unit 11 to move along the rotation grooves of the first rectilinear grooves 16ba to 16bc formed on the inner peripheral surface of the exterior unit 16, as shown in FIGS. 12A to 12C.

Figure 21:
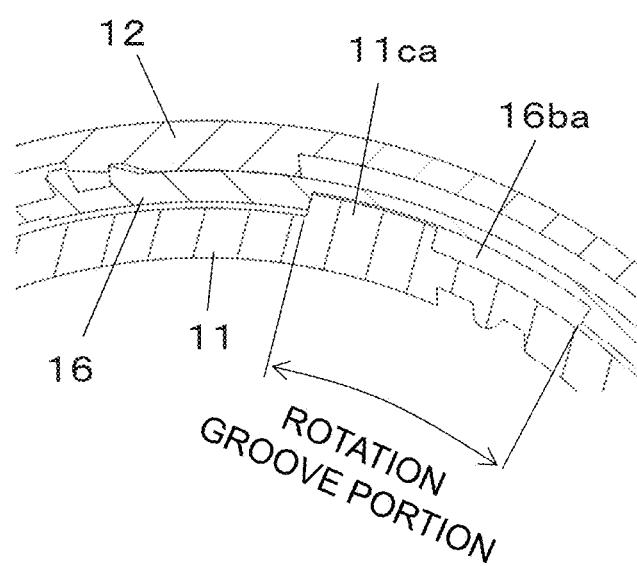
FIG. 21 is a cross-sectional view of the state when the tab provided at the end of the exterior unit is engaged with and fixed to the grooves provided to the front frame unit in the attachment of the front frame unit and the exterior unit to the outer peripheral surface of the first lens group unit shown in FIG. 5.

For example, as shown in FIG. 21, the first rectilinear key 11ca moves in the direction of the one-dot chain line arrow in the drawing along the portion of the rotary groove in the first rectilinear groove 16ba.

Figure 22:
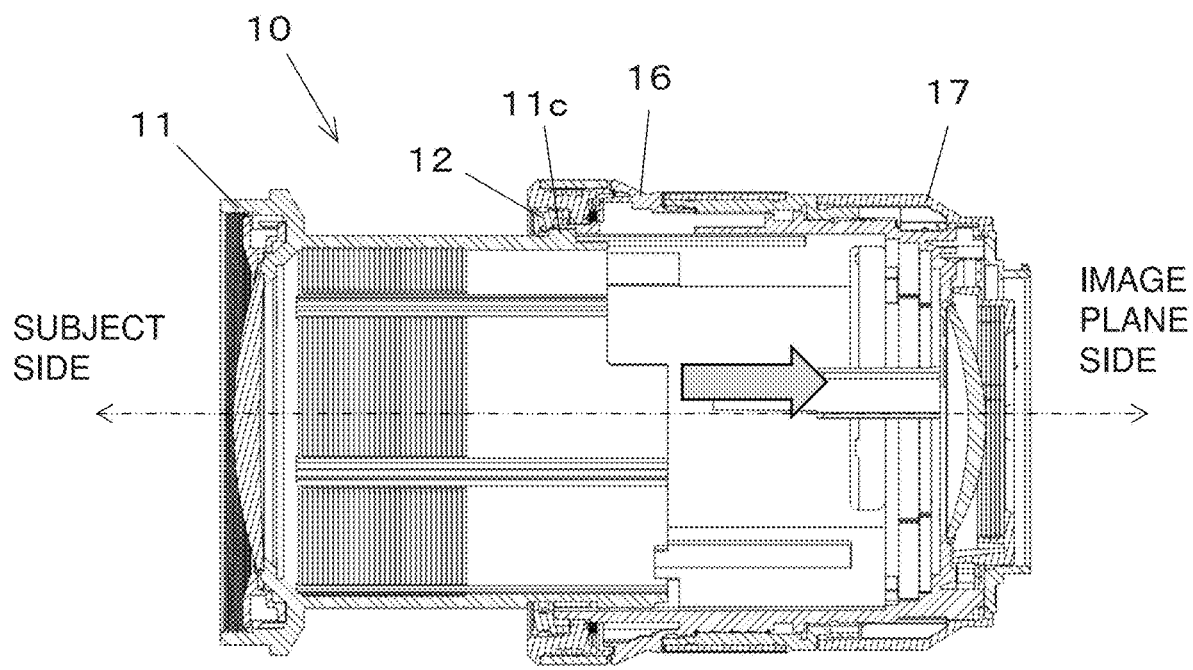
FIG. 22 is a cross-sectional view of the state when the rectilinear key is guided by the rectilinear groove and the first lens group unit is accommodated in the exterior unit, in a state in which the front frame unit and the exterior unit have been attached to the outer peripheral surface of the first lens group unit shown in FIG. 5.

Consequently, the first to third rectilinear keys 11ca to 11cc of the first lens group unit 11 move to the rectilinear portion on the inside, formed along the optical axis direction of the first to third rectilinear grooves 16ba to 16bc on the exterior unit 16 side, which results in a state in which movement is possible the optical axis direction, as shown in FIG. 22.

Furthermore, at this point, the relative rotation operation of the first lens group unit 11 with respect to the exterior unit 16 shown in FIG. 20 causes the three tab portions 16d provided at the end portion 16c of the exterior unit 16 to engage with the latching tabs 12c of the front frame unit 12.

Consequently, the exterior unit 16 is fixed with respect to the front frame unit 12 in the optical axis direction and is in an integrated state.

Therefore, the first lens group unit 11 can move back and forth in the optical axis direction with respect to the integrated front frame unit 12 and the exterior unit 16, and is housed on the inner peripheral surface side of the exterior unit 16.

Attachment Structure of FPC20

Figure 23:
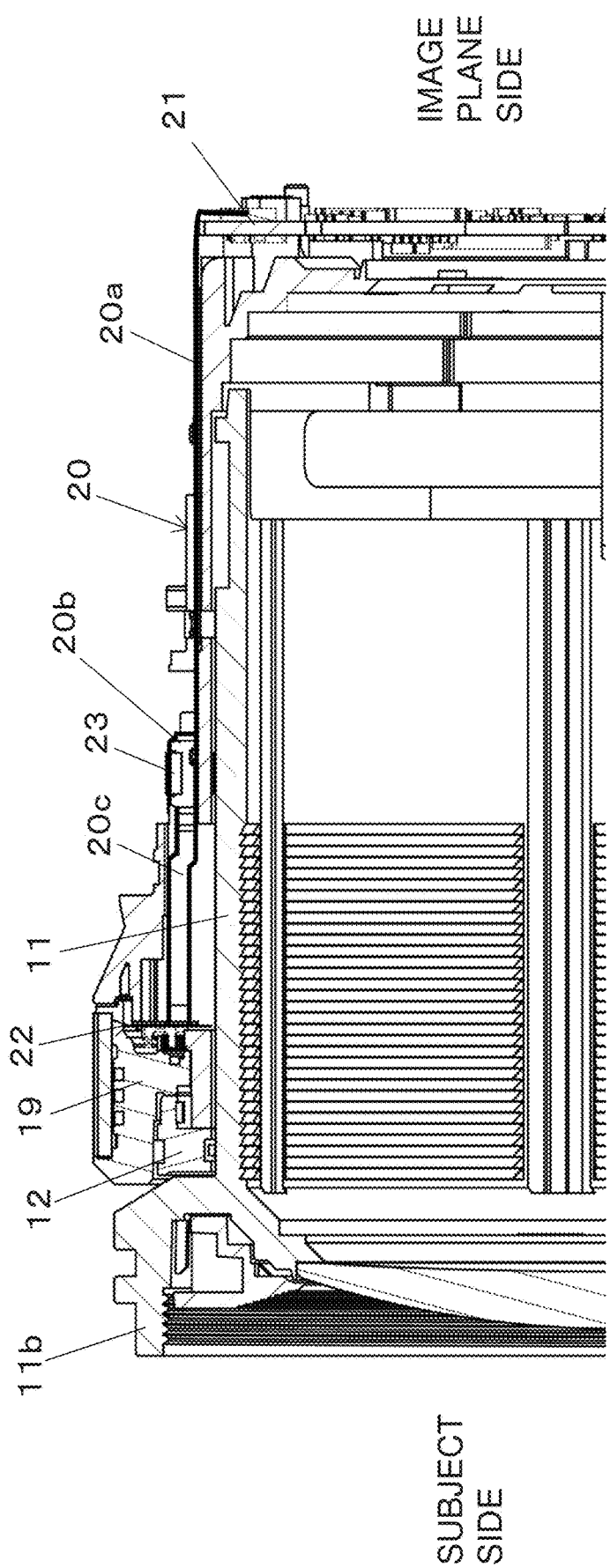
FIG. 23 is a cross-sectional view of an FPC provided to the exterior unit in FIG. 5.

With the lens barrel 10 in this embodiment, as shown in FIG. 23, the circuit board 21 disposed on the image plane side, and a rotation detection element 22 of the focus ring 19b disposed on the subject side are connected via an FPC (flexible printed circuit) 20 disposed on the outer peripheral surface of the exterior unit 16.

Figure 24A:
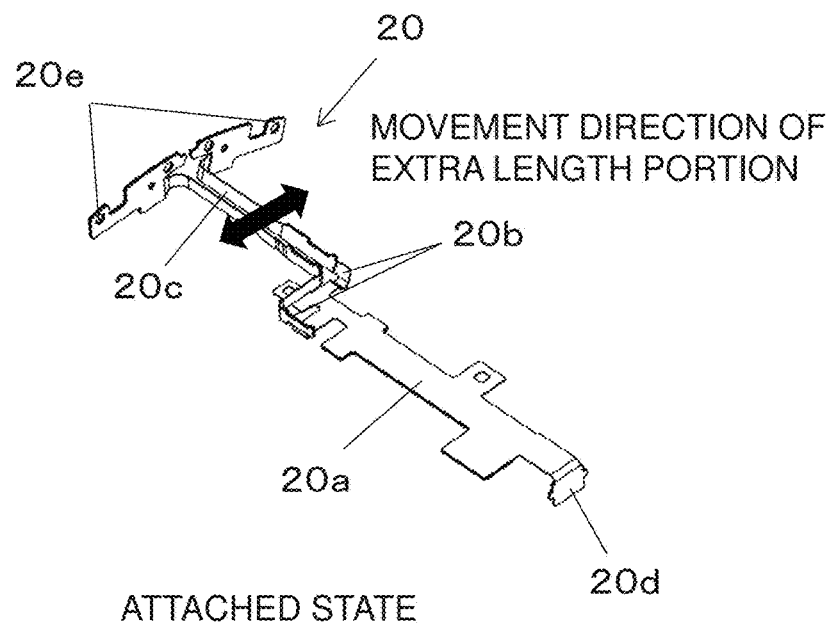
FIG. 24A is an oblique view of the FPC in FIG. 23.

The FPC 20 is a printed circuit board that is flexible and is formed, for example, from a resin such as polyimide, and as shown in FIG. 24A, has a flat portion 20a, a bent portion 20b, an extra length portion 20c, and connecting portions 20d and 20e. As shown in FIG. 23, the FPC 20 is fixed to the outer peripheral surface of the exterior unit 16 by a support portion 23 so that a part of the FPC 20 does not lift up from the outer peripheral surface of the exterior unit 16 as the first lens group unit 11 moves back and forth in the optical axis direction.

The flat portion 20a is attached to the outer peripheral surface of the main body portion 16a of the exterior unit 16, and is disposed on the image plane-side portion of the FPC 20.

The bent portion 20b is a portion that connects the flat portion 20a and the extra length portion 20c, and is disposed in the approximate center of the FPC 20. The bent portion 20b is bent so that the flat portion is at approximately 90 degrees with respect to the flat portion 20a, which puts the extra length portion 20c in a state of standing up with respect to the outer peripheral surface of the exterior unit 16.

Figure 24B:
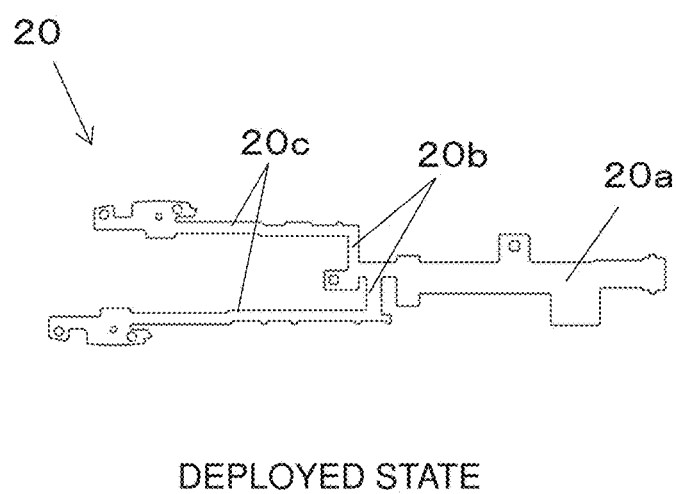
FIG. 24B is a plan view of the FPC in FIG. 24A in an expanded state.
Figure 25:
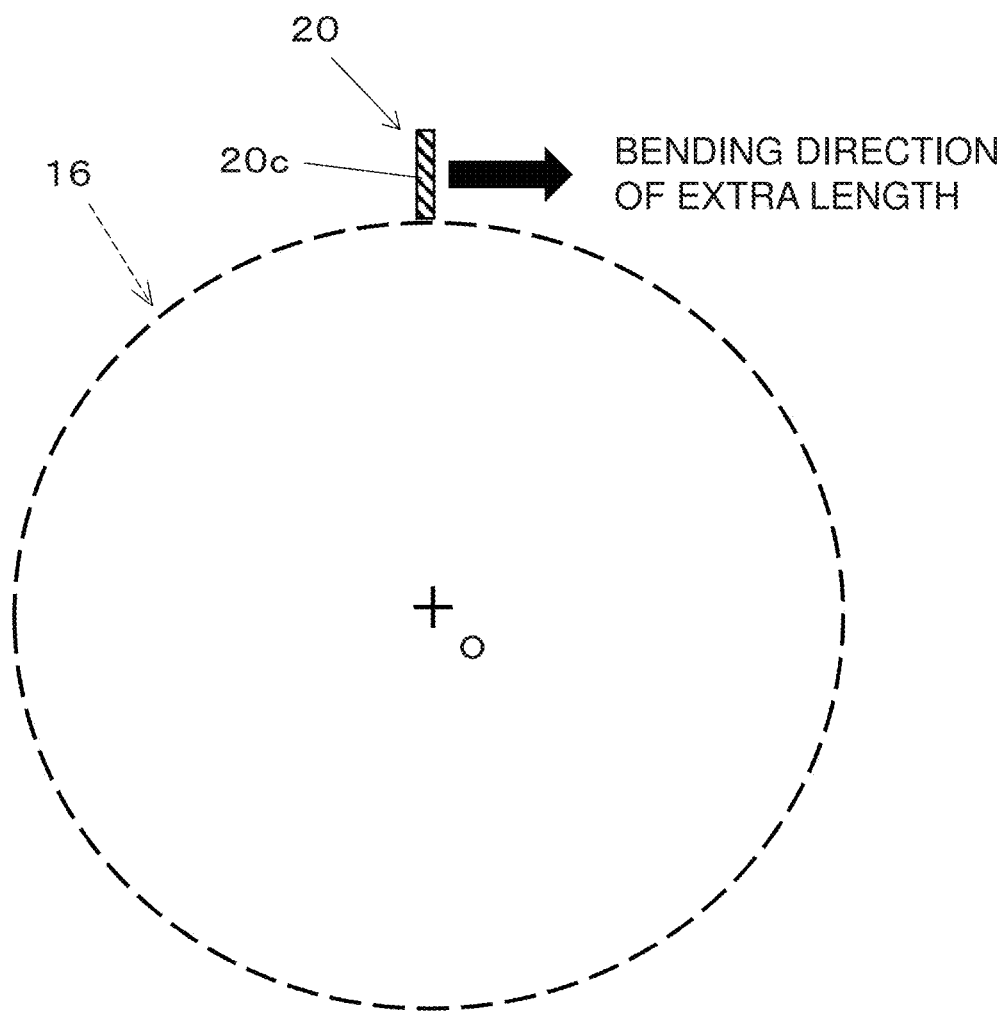
FIG. 25 is a schematic view showing the direction in which the FPC in FIG. 24A bends according to the retraction of the lens barrel.

More specifically, as shown in FIG. 24B, the bent portion 20b is such that the two branched portions coming from the flat portion 20a are each bent at about 90 degrees from a state in which the FPC 20 is deployed, putting the extra length portion 20c in a standing state.

The extra length portion 20c has a plane substantially perpendicular to the outer peripheral surface of the exterior unit 16 because the bent portion 20b is bent at approximately 90 degrees. Also, the extra length portion 20c deforms so as to bend as the first lens group unit 11 of the lens barrel 10 moves back and forth in the optical axis direction, and is housed in the interior of the lens barrel 10, including this bending portion.

Also, as shown in FIG. 23, the end portion (near the bent portion 20b) of the extra length portion 20c on the image plane side is fixed to the outer peripheral surface of the exterior unit 16 by the support portion 23 so as not to lift up from the outer peripheral surface of the exterior unit 16 when the first lens group unit 11 moves back and forth in the optical axis direction.

The connecting portion 20d is formed in a state of being bent at the end portion on the image plane side of the flat portion 20a, and is electrically connected to the circuit board 21 disposed on the image plane side.

The connecting portion 20e is formed in a state of being bent at the end portion on the subject side of the extra length portion 20c, and is electrically connected to the rotation detection element 22 of the focus ring 19b disposed on the subject side.

In the lens barrel 10 in this embodiment, the FPC 20 has the extra length portion 20c because of component tolerance, attachment variation, variance in connector position, and other such factors related to variance, and therefore the length of the FPC 20 varies.

In this embodiment, the FPC 20 is bent by about 90 degrees at a position near the approximate center.

Consequently, the extra length portion 20c of the FPC 20 caused by component tolerance and other such variance prevents bulging out to the radial side (the first lens group unit side), which eliminates the risk of malfunction of the lens barrel 10 caused by disconnection of the FPC 20 due to contact with the first lens group unit moving along the optical axis direction, etc.

Appendix 1

The lens barrel 10 disclosed herein comprises:

a substantially cylindrical first frame;

a substantially cylindrical third frame on the inner peripheral surface side of which the first frame moves relatively in the optical axis direction; and an FPC that is provided to the outer peripheral surface of the third frame and electrically connects a first component provided on the subject side in the optical axis direction and a second component provided on the image plane side, wherein the FPC has a flat portion that is attached to the outer peripheral surface of the third frame, an extra length portion generated in the optical axis direction, and a bent portion that is disposed at a position connecting the flat portion and the extra length portion and that is bent such that the extra length portion forms a plane of approximately 90 degrees with respect to the flat portion.

Consequently, the extra length portion of the FPC generated by variance such as component tolerance prevents bulging out to radial side (the first frame side), which eliminates the risk of malfunction of the lens barrel 10 caused by disconnection of the FPC 20 due to contact with the first frame moving along the optical axis direction, etc.

Appendix 2

The lens barrel 10 disclosed herein comprises:

a substantially cylindrical first member;

a substantially cylindrical second member that is disposed near the first member and rotates so as to slide with respect to the first member; and a grease pocket that is a space formed near the sliding surface on which the first member and the second member slide against each other, and that supplies grease to the sliding surface.

Consequently, in a lens barrel that includes manually rotated members, a space that holds grease is provided near the sliding surface provided between two substantially cylindrical parts, so the applied amount of grease, which is indispensable to good tactile operation, can be controlled.

Also, the grease pocket is preferably provided to the inside of the sliding surface in the radial direction.

This makes it possible to prevent excess grease from leaking out to the visible external portion of the lens barrel.

Other Embodiments

An embodiment of the present disclosure was described above, but the present disclosure is not limited to or by the above embodiment, and various modifications can be made without departing from the gist of the disclosure.

(A)

In the above embodiment, an example was given in which a gap G for offset attachment was formed between the outside diameter of the first lens group unit (first frame) 11 and the inside diameter of the front frame unit (second frame) 12, at a position opposite the first rectilinear key (protrusion) 11ca in the radial direction, by means of the thin-walled portion 11d for reducing the outside diameter of the first lens group unit (first frame) 11, but the present disclosure is not limited to this.

Figure 27:
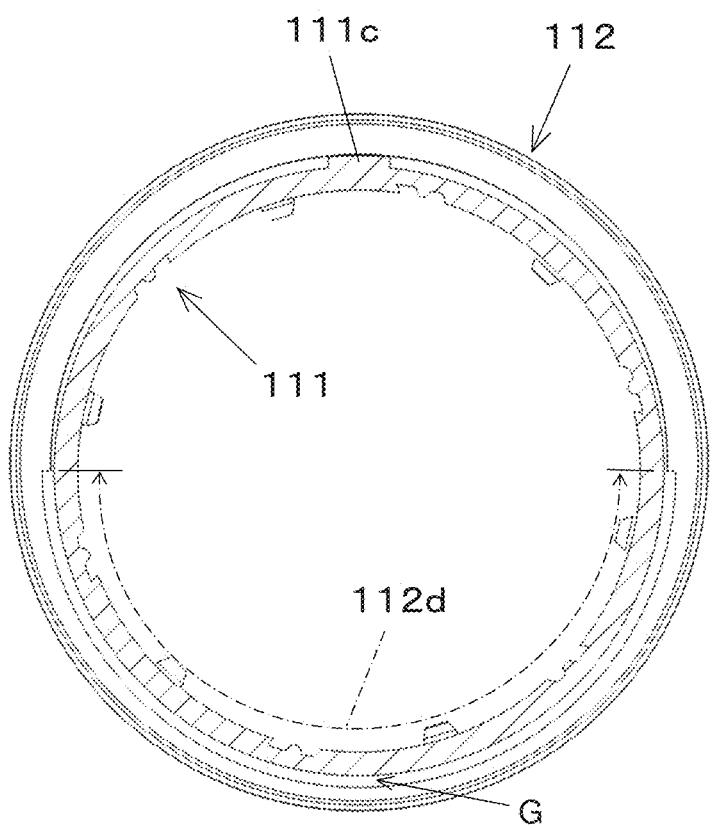
FIG. 27 is a front view of the state when the rectilinear key of the first lens group unit included in the lens barrel in another embodiment of this disclosure has been offset so as not to interfere with the inner peripheral surface of a front frame unit.

For example, as shown in FIG. 27, the configuration may be such that the gap G for offset attachment is formed between the outside diameter of a first lens group unit (first frame) 111 and the inside diameter of a front frame unit (second frame) 112, at a position opposite a rectilinear key (protrusion) 111c in the radial direction, by means of a thin-walled portion (second thin-walled portion) 112d for increasing the inside diameter of the front frame unit (second frame) 112.

(B)

In the above embodiment, an example was given in which a gap for offset attachment was formed between the outside diameter of the first lens group unit (first frame) 11 and the inside diameter of the front frame unit (second frame) 12, at a position opposite the first rectilinear key (protrusion) 11ca in the radial direction, by means of the thin-walled portion 11d for reducing the outside diameter of the first lens group unit (first frame) 11, but the present disclosure is not limited to this.

For example, the configuration may be such that a portion of the first frame opposite the rectilinear key in the radial direction is modified so that its outside diameter decreases so as to form a gap for offset attachment between the outside diameter of the first frame and the inside diameter of the second frame.

Alternatively, the configuration may be such that a portion of the second frame opposite the rectilinear key in the radial direction is modified so that its inside diameter increases so as to form a gap for offset attachment between the outside diameter of the first frame and the inside diameter of the second frame.

(C)

In the above embodiment, an example was given in which three first to third rectilinear keys 11ca to 11cc were provided on the outer peripheral surface of the first lens group unit (first frame) 11 at equal angle intervals of about 120 degrees, but the present disclosure is not limited to this.

For example, one, two, or four or more rectilinear keys may be provided on the outer peripheral surface of the first frame.

Also, the rectilinear keys do not need to be provided at equal angle intervals, and may be provided at unequal angle intervals.

(D)

In the above embodiment, an example was given in which the first to third rectilinear keys 11ca to 11cc were molded integrally with the first lens group unit (first frame) 11, but the present disclosure is not limited to this.

For example, the rectilinear keys may be provided as separate components with respect to the first frame.

Here again, after the rectilinear keys have been attached to the outer peripheral surface of the first frame, the second frame can be attached offset.

(E)

In the above embodiment, an example was given in which the thin-walled portion 11d was formed over a range of approximately 180 degrees opposite the first rectilinear key 11ca in the first lens group unit (first frame) 11, but the present disclosure is not limited to this.

For example, the range of the first thin-walled portion may be smaller than a range of approximately 180 degrees, or larger than approximately 180 degrees, so long as the gap required for the offset attachment of the first frame and the second frame is formed.

(F)

In the above embodiment, an example was given in which the configuration of the present disclosure was applied using the first lens group unit 11 as the first frame and the front frame unit 12 as the second frame, but the present disclosure is not limited to this.

For example, in a configuration of a lens barrel that is deployed in two stages, the configuration of the present disclosure may be applied using a drive frame disposed in the middle of this two-stage deployment as the first frame, and the front frame as the second frame.

(G)

In the above embodiment, an example was given in which the FPC 20, in which the bending direction of the extra length portion 20c was defined, was provided to the outer peripheral surface of the exterior unit 16, but the present disclosure is not limited to this.

For example, the FPC provided to a lens barrel formed by combining a plurality of substantially cylindrical members is not limited to being on the outer peripheral surface of the exterior unit, and may instead be provided to the outer peripheral surface or the inner peripheral surface of some other cylindrical member.

(H)

In the above embodiment, an example was given in which the grease pocket GP for supplying grease to the sliding surface F1 between the focus ring 19b and the front frame unit 12 was provided to inside of the sliding surface F1 in the radial direction, but the present disclosure is not limited to this.

For example, the position where the grease pocket is provided is not limited to the sliding surface between the focus ring and the front frame unit, and may instead be to the inside in the radial direction of the sliding surface over which other members slide.

INDUSTRIAL APPLICABILITY

An effect of the lens barrel disclosed herein is that fewer number parts are required as compared with a conventional lens barrel constituted by a combination of a plurality of cylindrical parts, which means that this invention can be widely applied to various kinds of lens barrel.

The invention claimed is:

1. A lens barrel, comprising:
a substantially cylindrical first frame that holds a lens, the first frame including an image plane side and a subject side in relation to an optical axis direction; and
a substantially cylindrical second frame having an inside diameter and which is disposed in a state of encircling an outer peripheral surface side of the substantially cylindrical first frame on the subject side,
the first frame has a protrusion on the image plane side, the protrusion extending outward in a radial direction from an outer peripheral surface of the first frame,
the first frame and the second frame are formed so that a gap is formed on the image plane side between the outside diameter of the first frame and the inside diameter of the second frame at a position opposite the protrusion in the radial direction,
whereby a distance between the outside surface of the first frame at the gap and an outermost surface of the protrusion in a direction orthogonal to the optical axis is less than the inside diameter of the second frame,
a diameter of the outer peripheral surface side of the first frame on the subject side is less than the inside diameter of the second frame, and
the inside diameter of the second frame is less than a sum of the diameter of the outer peripheral surface side of the first frame on the subject side and an amount by which the protrusion extends radially from the outer surface of the first frame on the image plane side.

2. The lens barrel according to claim 1,
wherein the first frame further has a first thin-walled portion at a position opposite the protrusion in the radial direction, whose thickness is less than the thickness around the protrusion and which reduces the outside diameter of the first frame.

3. The lens barrel according to claim 2,
wherein the second frame has a substantially circular shape.

4. The lens barrel according to claim 2,
wherein the first thin-walled portion is formed within a range of approximately 180 degrees opposite the protrusion in the radial direction.

5. The lens barrel according to claim 1,
wherein the second frame further has a second thin-walled portion whose thickness is less than the thickness around the protrusion, at a position opposite the protrusion of the first frame in the radial direction, and which increases the inside diameter of the second frame.

6. The lens barrel according to claim 1,
wherein the second frame is larger than a circumscribed circle of the first frame in a plane perpendicular to a center axis of the substantially cylindrical first frame, which includes the protrusion of the first frame, and has an inside diameter that is less than twice a length from the center axis of the first frame to an outer surface of the protrusion.

7. The lens barrel according to claim 1,
wherein the protrusion is molded integrally with the first frame.

8. The lens barrel according to claim 1,
wherein a plurality of the protrusions are provided on the outer peripheral surface of the first frame.

9. The lens barrel according to claim 8,
wherein the plurality of protrusions are provided at substantially equal angular intervals on the outer peripheral surface of the substantially cylindrical first frame.

10. The lens barrel according to claim 9,
wherein three of the plurality of protrusions are provided at equal intervals of approximately 120 degrees.

11. The lens barrel according to claim 8,
wherein the plurality of protrusions are provided at mutually different positions in the optical axis direction.

12. The lens barrel according to claim 1,
wherein the first frame further has a large diameter portion that is larger than the inside diameter of the second frame on a subject side in the optical axis direction.

13. The lens barrel according to claim 1,
further comprising a substantially cylindrical third frame that is disposed in a state of being close to an outer peripheral surface side of the first frame, and is mated with and fixed to the second frame.

14. The lens barrel according to claim 13,
wherein the third frame has a groove portion that is formed on an inner peripheral surface side along the optical axis direction and that engages with the protrusion of the first frame.

* * * * *